United States Patent
Edmark et al.

(10) Patent No.: US 7,389,497 B1
(45) Date of Patent: *Jun. 17, 2008

(54) METHOD AND SYSTEM FOR TRACING PROFILING INFORMATION USING PER THREAD METRIC VARIABLES WITH REUSED KERNEL THREADS

(75) Inventors: Ronald O'Neal Edmark, Austin, TX (US); Frank Eliot Levine, Austin, TX (US); Robert J. Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1626 days.

This patent is subject to a terminal disclaimer.

(21) Appl. No.: 09/612,350

(22) Filed: Jul. 6, 2000

(51) Int. Cl.
*G06F 9/44* (2006.01)
*G06F 9/45* (2006.01)
(52) U.S. Cl. .......................... 717/130; 717/131
(58) Field of Classification Search ................. 717/127, 717/128, 130, 137, 158, 131
See application file for complete search history.

(56) References Cited

U.S. PATENT DOCUMENTS

| | | | |
|---|---|---|---|
| 4,746,920 A | 5/1988 | Nellen et al. ............... | 340/825 |
| 4,821,220 A | 4/1989 | Duisberg ..................... | 364/578 |
| 5,047,919 A | 9/1991 | Sterling et al. .............. | 364/200 |
| 5,161,226 A | 11/1992 | Wainer ........................ | 395/650 |
| 5,179,702 A | 1/1993 | Spix et al. .................... | 395/650 |
| 5,307,499 A | 4/1994 | Yin ............................... | 395/700 |
| 5,355,487 A | 10/1994 | Keller et al. ................ | 395/650 |
| 5,371,878 A | 12/1994 | Coker .......................... | 395/500 |

(Continued)

FOREIGN PATENT DOCUMENTS

DE  296 00 609 U1  3/1997

(Continued)

OTHER PUBLICATIONS

A Unifying Approach to Performance Analysis In The Java Environment; Alexander et al; vol. 39, No. 1; pp. 1-16.

(Continued)

*Primary Examiner*—Tuan Dam
*Assistant Examiner*—Chuck Kendall
(74) *Attorney, Agent, or Firm*—Duke W. Yee; Libby Z. Handelsman; Theodore D. Fay, III

(57) ABSTRACT

A method and system for tracing profiling information using per thread metric variables with reused kernel threads is disclosed. In one embodiment kernel thread level metrics are stored by the operating system kernel. A profiler request metric information for the operating system kernel in response to an event. After the kernel thread level metrics are read by the operating system for a profiler, their values are reset to zero by the operating system kernel. The profiler then applies the metric values to base metric values to appropriate Java threads that are stored in nodes in a tree structure base on the type of event and whether or not the kernel thread has been reused. In another embodiment non-zero values of thread level metrics are entered on a liked list. In response to a request from a profiler, the operating system kernel reads each kernel thread's entry in the linked list and zeros each entry. The profiler can then update the intermediate full tree snapshots of profiling information with the collection of non-zero metric variables.

21 Claims, 32 Drawing Sheets

U.S. PATENT DOCUMENTS

| | | | | |
|---|---|---|---|---|
| 5,442,758 | A | 8/1995 | Slingwine et al. | 395/375 |
| 5,450,586 | A | 9/1995 | Kuzara et al. | 395/700 |
| 5,459,868 | A | 10/1995 | Fong | 395/700 |
| 5,483,654 | A | 1/1996 | Staron et al. | 395/650 |
| 5,485,574 | A * | 1/1996 | Bolosky et al. | 717/127 |
| 5,509,070 | A | 4/1996 | Schull | 380/4 |
| 5,613,118 | A | 3/1997 | Heisch et al. | 395/709 |
| 5,682,328 | A | 10/1997 | Roeber et al. | 364/550 |
| 5,706,515 | A | 1/1998 | Connelly et al. | 395/676 |
| 5,742,672 | A | 4/1998 | Burk | 379/198 |
| 5,761,380 | A | 6/1998 | Lewis et al. | 395/12 |
| 5,768,500 | A | 6/1998 | Agrawal et al. | 395/184.01 |
| 5,799,143 | A | 8/1998 | Butt et al. | 395/183.14 |
| 5,845,077 | A | 12/1998 | Fawcett | 395/200.51 |
| 5,872,909 | A | 2/1999 | Wilner et al. | 395/183.14 |
| 5,884,080 | A | 3/1999 | Blandy et al. | 395/704 |
| 5,884,082 | A | 3/1999 | Seidel et al. | |
| 5,896,538 | A * | 4/1999 | Blandy et al. | 717/127 |
| 5,908,470 | A | 6/1999 | Stonecypher, Jr. | 713/502 |
| 5,919,247 | A | 7/1999 | Van Hoff et al. | 709/217 |
| 5,964,846 | A | 10/1999 | Berry et al. | 709/400 |
| 5,966,540 | A | 10/1999 | Lister et al. | 395/712 |
| 5,978,578 | A | 11/1999 | Azarya et al. | 395/701 |
| 5,991,543 | A | 11/1999 | Amberg et al. | 395/712 |
| 5,995,757 | A | 11/1999 | Amberg et al. | 395/712 |
| 6,006,035 | A | 12/1999 | Nabahi | 395/712 |
| 6,016,466 | A * | 1/2000 | Guinther et al. | 702/187 |
| 6,539,339 | B1 * | 3/2003 | Berry et al. | 717/127 |
| 6,735,758 | B1 * | 5/2004 | Berry et al. | 717/130 |
| 6,904,594 | B1 * | 6/2005 | Berry et al. | 718/100 |

FOREIGN PATENT DOCUMENTS

| | | |
|---|---|---|
| JP | 5-303533 | 11/1993 |
| WO | WO 94/14117 | 6/1994 |
| WO | WO 96/12224 | 4/1996 |

OTHER PUBLICATIONS

Java Virtual Machine Profiler Interface; Viswanathan et al.; vol. 39, No. 1; pp. 1-14.

Call Path Profiling of Monotonic Program Resources In UNIX; Hall et al; Jun. 24-25, 1993; pp. 1-13.

Exploiting Hardware Performance Counters with Flow and Context 3ensitive Profiling; Ammons et al; 1997; pp. 85-96.

Optimally Profiling and Tracing Programs; Ball et al; Jul. 1994; pp. 1319-1360.

Data Structure and Insertion Algorithm for Representing Asynchronous Occurrences for Visualization by Trace Visualization Tools using Ghant Charts with Occurrence Hierarchies; International Business Machines Technical Disclosure Bulletin; vol. 36, No. 7, Jul. 1993; pp. 547-557.

Adaptive Trace-Directed Program Restructuring; International Business Machines Technical Disclosure Bulletin; vol. 37 No. 02B, Feb. 1994; pp. 115-116.

Profiling and Tracing Dynamic Library Usage Via Interposition; Curry; USENIX Conference; 1994; pp. 267-278.

Application of Interpreter for Debugging Functions; International Business Machines Technical Disclosure Bulletin; vol. 36, No. 09B, Sep. 1993; pp. 67-68.

Minimizing Locking to Access Global Shared Data; International Business Machines Technical Disclosure Bulletin; Feb. 1995; pp. 619-622.

* cited by examiner

Interrupt Hook

| Timestamp | Event | Call Stack After Event |
|---|---|---|
| 0 | enter C | |
| 1 | enter A | C |
| 2 | enter B | CA |
| 3 | exit from B | CAB |
| 4 | enter B | CA |
| 5 | enter B | CAB |
| 6 | exit from B | CABB |
| 7 | exit from B | CAB |
| 8 | exit from A | CA |
| 9 | enter B | C |
| 10 | enter A | CB |
| 11 | enter B | CBA |
| 12 | enter A | CBAB |
| 13 | exit from A | CBABA |
| 14 | exit from B | CBA |
| 15 | enter X | CBAX |
| 16 | exit from X | CBA |
| 17 | exit from A | CB |
| 18 | exit from B | C |
| 19 | exit from C | |

Figure 10A

| Sample | Call Stack @ Sample |
|---|---|
| 1 | C |
| 2 | CAB |
| 3 | CAB |
| 4 | CAB |
| 5 | C |
| 6 | CBA |
| 7 | CBABA |
| 8 | CBA |
| 9 | CBA |
| 10 | C |

Figure 10B

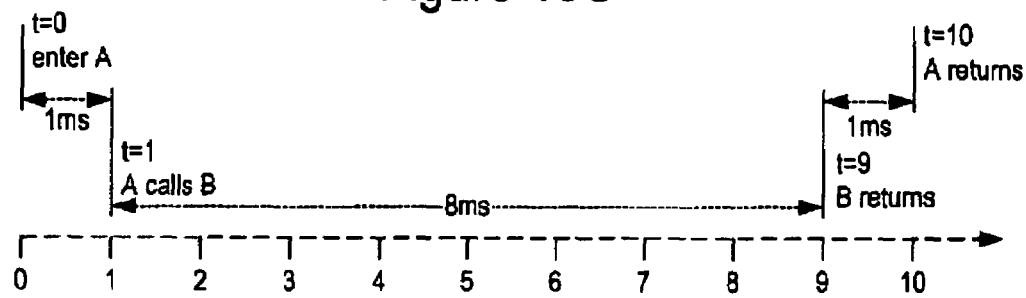
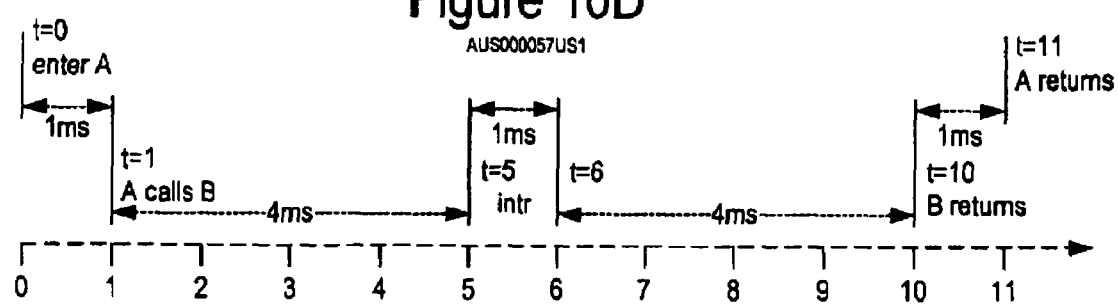

| Level 1230 | RL 1232 | Calls 1234 | Base 1236 | Cum 1238 | Indent 1240 |
|---|---|---|---|---|---|
| 0 | 1 | 1 | 0 | 19 | pt_pidtid |
| 1 | 1 | 1 | 3 | 19 | - C |
| 2 | 1 | 1 | 3 | 7 | - - A |
| 3 | 1 | 2 | 3 | 4 | - - - B |
| 4 | 2 | 1 | 1 | 1 | - - - - B |
| 2 | 1 | 1 | 2 | 9 | - - B |
| 3 | 1 | 1 | 3 | 7 | - - - A |
| 4 | 2 | 1 | 2 | 3 | - - - - B |
| 5 | 2 | 1 | 1 | 1 | - - - - - A |
| 4 | 1 | 1 | 1 | 1 | - - - - X |

| Calls 1602 | Base 1604 | Cum 1606 | Name 1608 |
|---|---|---|---|
| 1 | 0 | 19 | pt_pit.tid |
| 1 | 3 | 19 | C |
| 3 | 7 | 14 | A |
| 5 | 8 | 13 | B |
| 1 | 1 | 1 | X |

ArcFlow Output
    Base - Time/Instructions directly in function
    Cum - Time/Instructions directly & indirestly in function
ArcFlow Invarients:
    1) Sum(Parent(Calls)) = Self(Calls)
    2) Sum(Parent(Base)) = Self(Base)
    3) Sum(Parent(Cum)) = Self(Cum)
    4) Sum(Child(Cum)) = Self(Cum) - Self(Base)

| Source  | Calls | Base | Cum | Function    |
|---------|-------|------|-----|-------------|
| Self    | 1     | 0    | 19  | [0] pt_pidtid |
| Child   | 1     | 3    | 19  | C           |
| Parent  | 1     | 3    | 19  | pt_pidtid   |
| Self    | 1     | 3    | 19  | [1] C       |
| Child   | 1     | 2    | 9   | B           |
| Child   | 1     | 3    | 7   | A           |
| Parent  | 1     | 3    | 7   | C           |
| Parent  | 1     | 3    | 7   | B           |
| rParent | 1     | 1    | 1   | B           |
| Self    | 3     | 7    | 17  | [2] A       |
|         |       |      | 15  |             |
| Child   | 3     | 5    | 7   | B           |
| Child   | 1     | 1    | 1   | X           |
| Parent  | 2     | 3    | 4   | A           |
| rParent | 1     | 2    | 3   | A           |
| Parent  | 1     | 2    | 9   | C           |
| Self    | 5     | 8    | 13  | [3] B       |
|         |       |      | 17  |             |
| Child   | 1     | 3    | 7   | A           |
| rChild  | 1     | 1    | 1   | A           |
| Child   | 1     | 1    | 1   | B           |
| Parent  | 1     | 1    | 1   | A           |
| Self    | 1     | 1    | 1   | [4] X       |

Figure 19

| Major Code | Minor Code | Data Item 1 | Data Item 2 | Data Item 3 | Data Item 4 | Data Item 5 | Description |
|---|---|---|---|---|---|---|---|
| 0x4 | level + 0x1 | depth | n/a | n/a | n/a | | begin interrupt at level |
| 0x4 | level + 0x80000001 | depth | n/a | n/a | n/a | | end interrupt at level |
| 0x10 | 0xab | system tid | java tid | is System Thread (boolean) | n/a | | thread created without a name while trace active |
| 0x10 | 0xac | system tid | n/a | n/a | n/a | | identifies the idle thread |
| 0x10 | 0xad | system tid | n/a | n/a | n/a | | identifies the garbage collection thread |
| 0x10 | 0xae | system tid | java tid | thread name | n/a | | thread created with a name while trace active |
| 0x30 | 0x10 | object id | method block address | n/a | n/a | | method invocation (interpreted) |
| 0x30 | 0x10 + 0x80000000 | object id | method block address | n/a | n/a | | method exit (interpreted) |
| 0x40 | 0x7fffffff | number (n) of stack unwinds at timer interrupt | pc1-program counter of interrupted routine | pc2-caller of interrupted routine | ........ | pcn-1 of n-2nd caller of interrupted routine | pcn of n-1st caller of interrupted routine |
| 0x41 | 0x7fffffff | number (n) of stack unwinds at instrumented routine | pc1-program counter of instrumented routine | pc2-caller of instrumented routine | ........ | | pcn of n-1st caller of instrumented routine |
| 0x50 | 0x10 | object id | method block address | n/a | n/a | | method invocation (jitted) |
| 0x50 | 0x10 + 0x80000000 | object id | method block address | n/a | n/a | | method exit (jitted) |

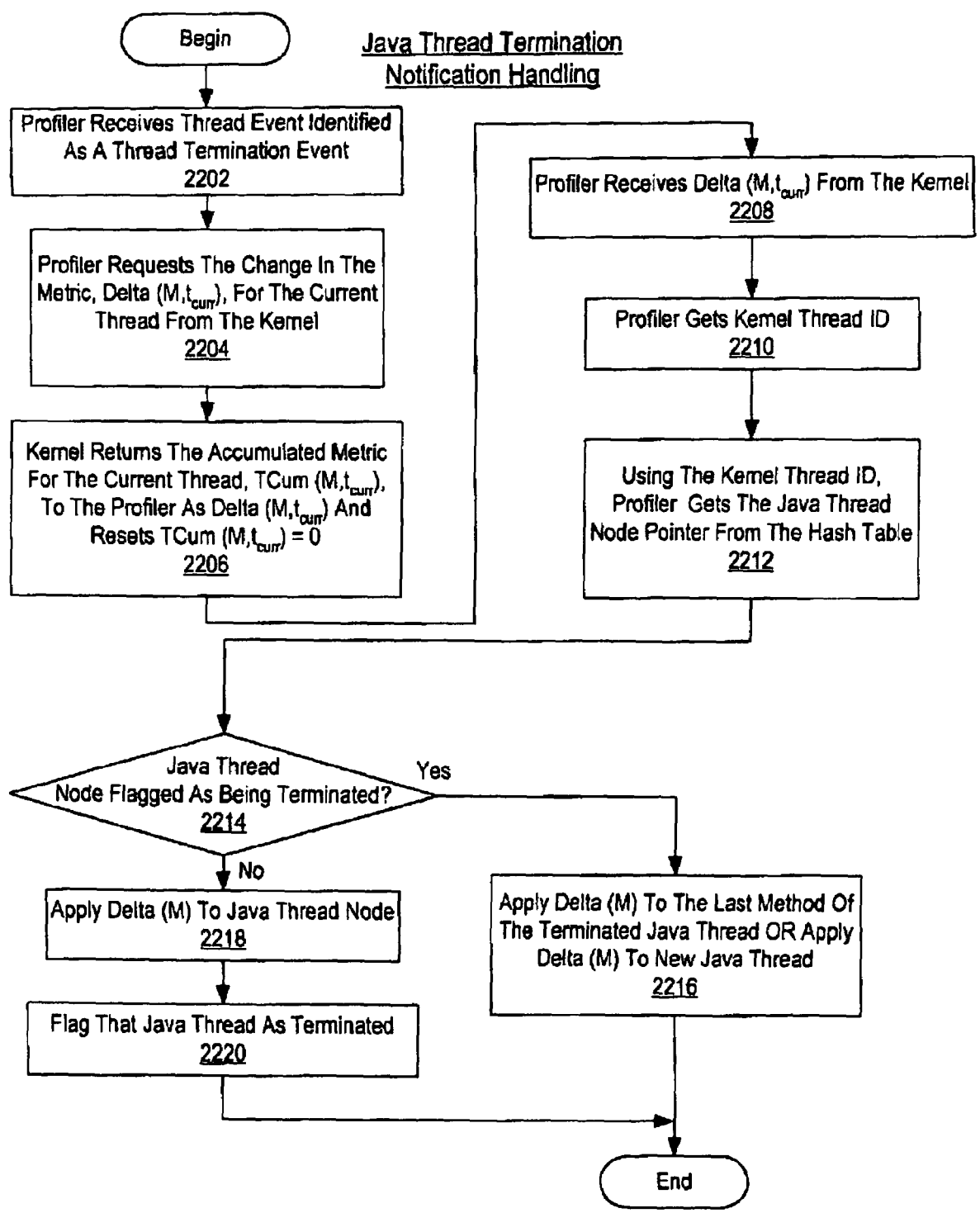

Process for the Kernel Updating Base Metric Response to a Thread Dispatch Event

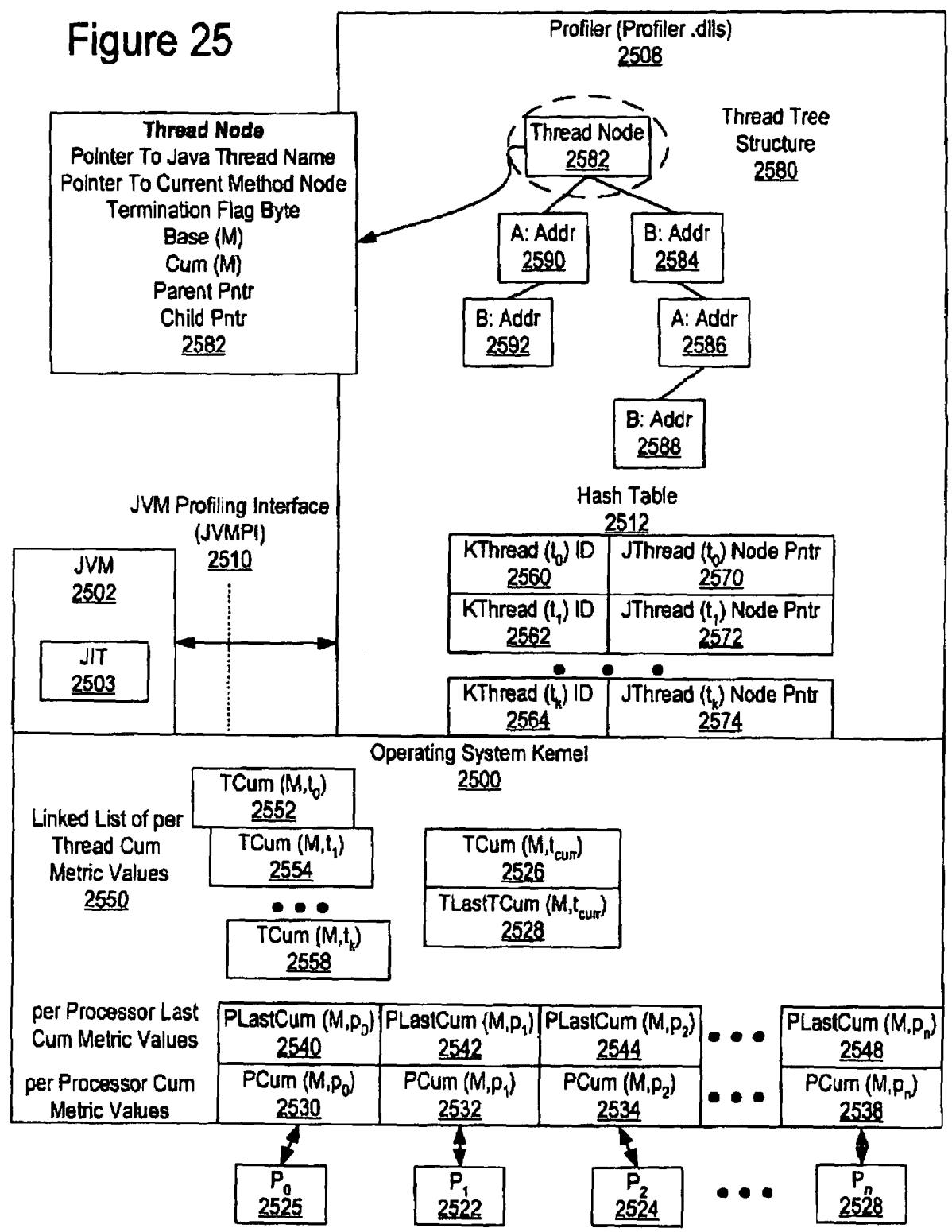

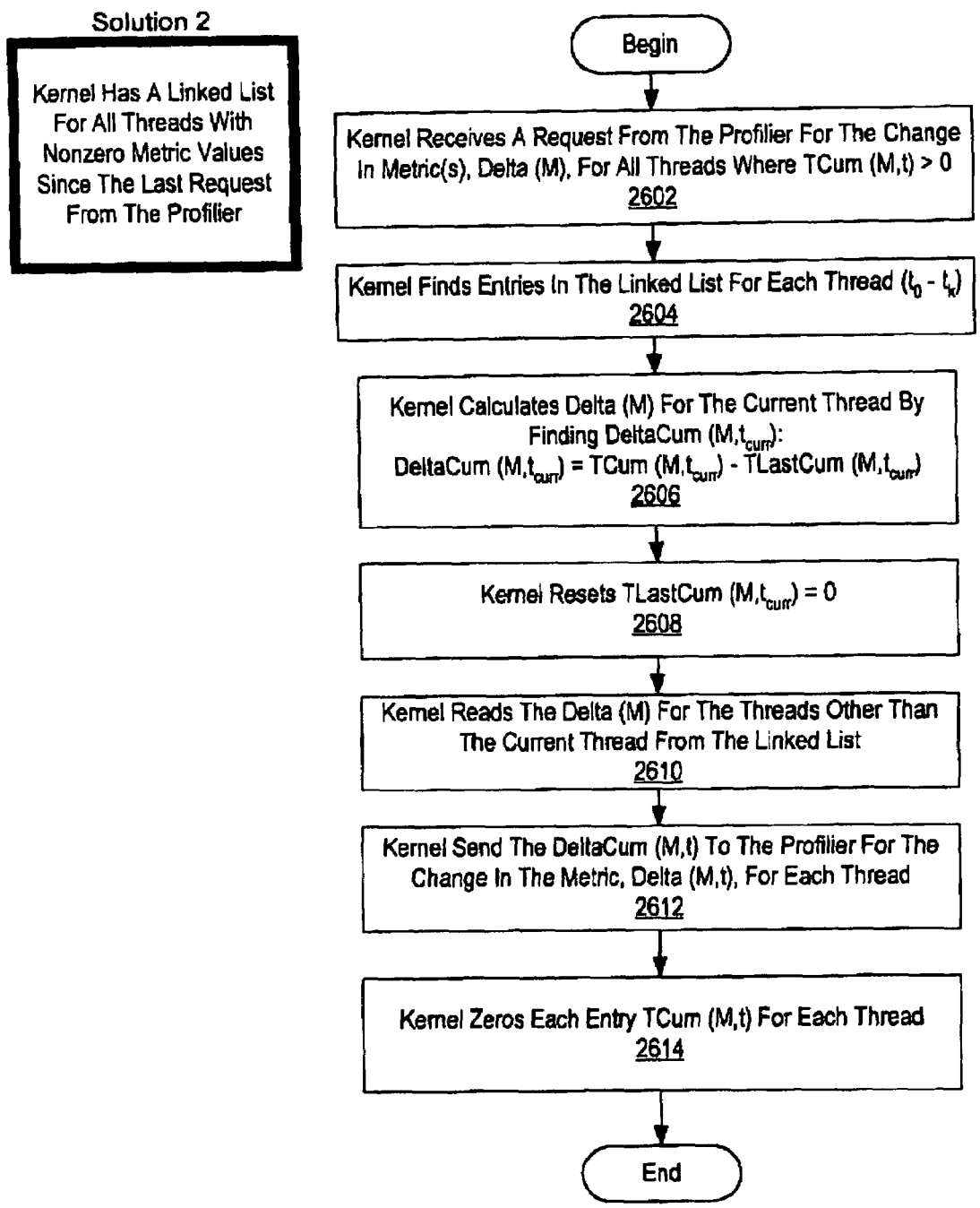

METHOD AND SYSTEM FOR TRACING PROFILING INFORMATION USING PER THREAD METRIC VARIABLES WITH REUSED KERNEL THREADS

CROSS-REFERENCE TO RELATED APPLICATIONS

This application is related to the following copending and commonly assigned applications entitled "SYSTEM AND METHOD FOR PROVIDING TRACE INFORMATION REDUCTION", U.S. application Ser. No. 08/989,725, filed on Dec. 12, 1997, currently pending, "A METHOD AND APPARATUS FOR STRUCTURED PROFILING OF DATA PROCESSING SYSTEMS AND APPLICATIONS,", U.S. application Ser. No. 09/052,329, currently pending, filed on Mar. 31, 1998. "A METHOD AND APPARATUS FOR STRUCTURED MEMORY ANALYSIS OF DATA PROCESSING SYSTEMS AND APPLICATIONS", U.S. application Ser. No. 09/052,331, currently pending, filed on Mar. 31, 1998, and "METHOD AND APPARATUS FOR PROFILING PROCESSES IN A DATA PROCESSING SYSTEM", U.S. application Ser. No. 09/177,031, currently pending, filed on Oct. 22, 1998, "PROCESS AND SYSTEM FOR MERGING TRACE DATA FOR PRIMARILY INTERPRETED METHODS". U.S. application Ser. No. 09/343,439, currently pending, filed on Jun. 30, 1999; "METHOD AND SYSTEM FOR MERGING EVENT-BASED DATA AND SAMPLED DATA INTO POSTPROCESSED TRACE OUTPUT", U.S. application Ser. No. 09/343,438, currently pending, filed Jun. 30, 1999; "METHOD AND SYSTEM FOR APPORTIONING CHANGES IN METRIC VARIABLES IN AN SYMMETRIC MULTIPROCESSOR (SMP) ENVIRONMENT", U.S. application Ser. No. 09/612,340, filed Jul. 6, 2000; "METHOD AND SYSTEM FOR TRACING PROFILING INFORMATION IN AN APPLICATION USING PER THREAD METRIC VARIABLES WITH REUSED KERNEL THREADS", U.S. application Ser. No. 09/612,349, filed Jul. 6, 2000; "METHOD AND SYSTEM FOR TRACING PROFILING INFORMATION USING PER THREAD METRIC VARIABLES WITH REUSED KERNEL THREADS", U.S. application Ser. No. 09/612,350, filed Jul. 6, 2000; and "METHOD AND SYSTEM FOR SMP PROFILING USING SYNCHRONIZED OR NON-SYNCHRONIZED METRIC VARIABLES WITH SUPPORT ACROSS MULTIPLE SYSTEMS", U.S. application Ser. No. 09/611,666, filed Jul. 6, 2000.

BACKGROUND OF THE INVENTION

1. Technical Field

The present invention relates to an improved data processing system and, in particular, to a method and apparatus for optimizing performance in a data processing system. Still more particularly, the present invention provides a method and apparatus for a software program development tool for enhancing performance of a software program through software profiling.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules, which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas, which might benefit most from improvements to the code.

Another trace technique involves periodically sampling a program's execution flows to identify certain locations in the program in which the program appears to spend large amounts of time. This technique is based on the idea of periodically interrupting the application or data processing system execution at regular intervals, so-called sample-based profiling. At each interruption, information is recorded for a predetermined length of time or for a predetermined number of events of interest. For example, the program counter of the currently executing thread, which is a process that is part of the larger program being profiled, may be recorded during the intervals. These values may be resolved against a load map and symbol table information for the data processing system at post-processing time, and a profile of where the time is being spent may be obtained from this analysis.

For example, isolating such hot spots to the instruction level permits compiler writers to find significant areas of suboptimal code generation at which they may thus focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

When profiling includes gather profiling information at the processor level, the profiler must rely on the operating system for the profile information. The Java Virtual Machine (Jvm) may reuse kernel thread IDs when processing an application. When an operating system kernel reuses a kernel thread ID for a current Java thread, in cannot be known for certain if the value of the kernel thread's metrics should be attributed to the current Java thread in its entirety. A portion of the change in the value of an accumulated metric for the reused kernel thread may be from a previous Java thread. Therefore, when a profiler calls for the change in a value of an accumulated kernel thread metric variable, the value returned to the profiler might be too high because metrics for the kernel thread were accumulated for other Java threads since the last request. Profiling information for a Java thread, which gets its metric variable values from a reused kernel thread, is unreliable unless a means for apportioning the value of the change in a metric for a reused kernel thread ID between Java threads.

Therefore, it would be advantageous to provide a system in which accurate profiling information could be obtained when kernel thread Ids are reused.

SUMMARY OF THE INVENTION

A method and system for tracing profiling information using per thread metric variables with reused kernel threads is disclosed. In one embodiment kernel thread level metrics are stored by the operating system kernel. A profiler requests metric information from the operating system kernel in response to an event. After the kernel thread level metrics are read by the operating system for a profiler, their values are reset to zero. The profiler then applies the metric values to base metric values to appropriate Java threads that are stored in nodes in a tree structure base on the type of event and whether or not the kernel thread has been reused. In another embodiment non-zero values of thread level metrics are entered on a linked list. In response to a request from a profiler, the operating system kernel reads each kernel thread's entry in the linked list and zeros each entry. The profiler can then update the intermediate full tree snapshots of profiling information with the collection of non-zero metric variables.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10A is a diagram depicting a program execution sequence along with the state of the call stack at each function entry/exit point;

FIG. 10B is a diagram depicting a particular timer based sampling of the execution flow depicted in FIG. 10A;

FIGS. 10C-D are time charts providing an example of the types of time for which the profiling tool accounts;

FIG. 12 is a table depicting a call stack tree;

FIG. 16 is a diagram depicting a record generated using the processes of the present invention;

FIG. 17 is a diagram depicting another type of report that may be produced to show the calling structure between routines shown in FIG. 12;

FIG. 19 is a table depicting major codes and minor codes that may be employed to instrument modules for profiling;

FIG. 22 is a flowchart depicting a Java thread process for handling a thread termination notification in accordance with a preferred embodiment of the present invention;

FIG. 25 is a blocked diagram that depicts a relationship to a profiler and other software components in a data processing system, which reuses operating system kernel threads for accurately tracking the value of metric variables in accordance with a preferred embodiment of the present invention; and FIG. 26 is a flowchart depicting a process for updating the value of a base metric variable when the operating system kernel stores the change in the non-zero.

DETAILED DESCRIPTION OF A PREFERRED EMBODIMENT

Figure 1:
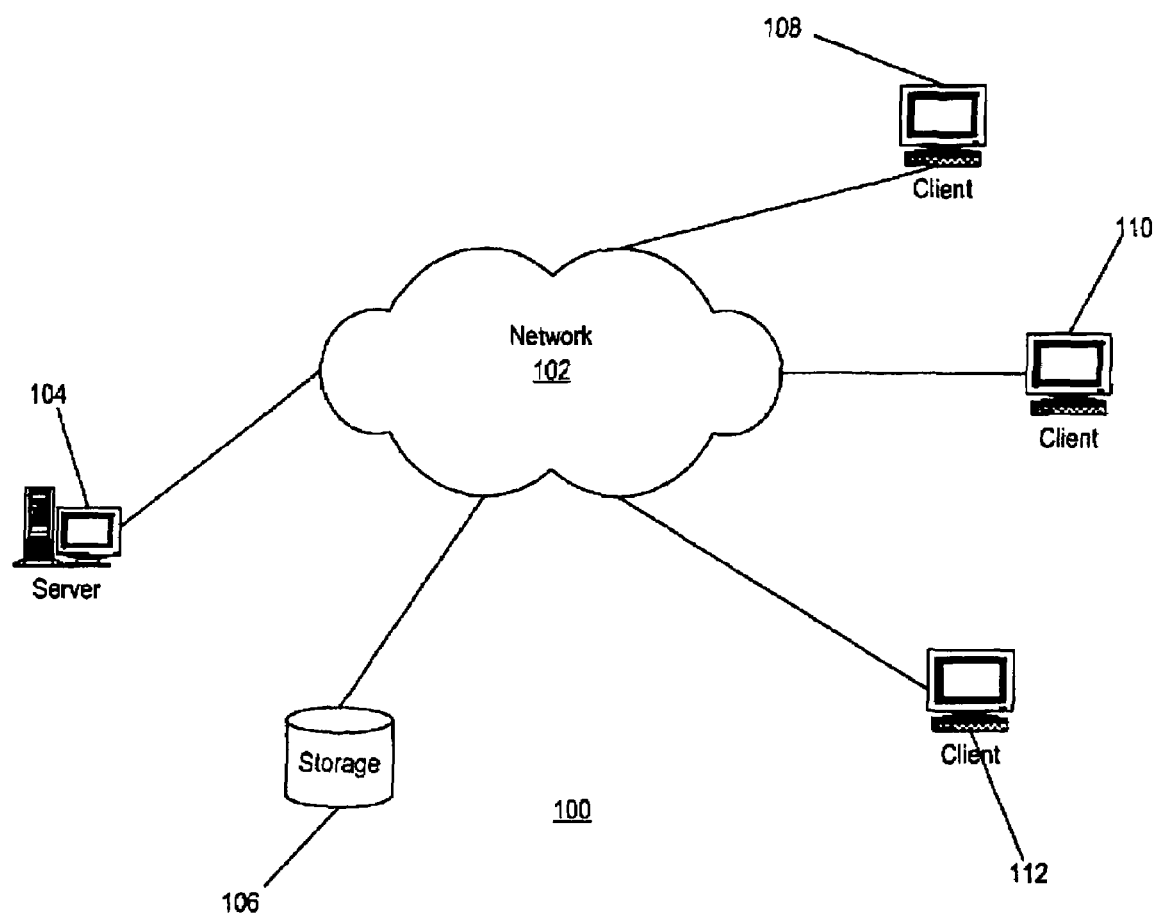
FIG. 1 is an illustration depicting a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

Figure 2A:
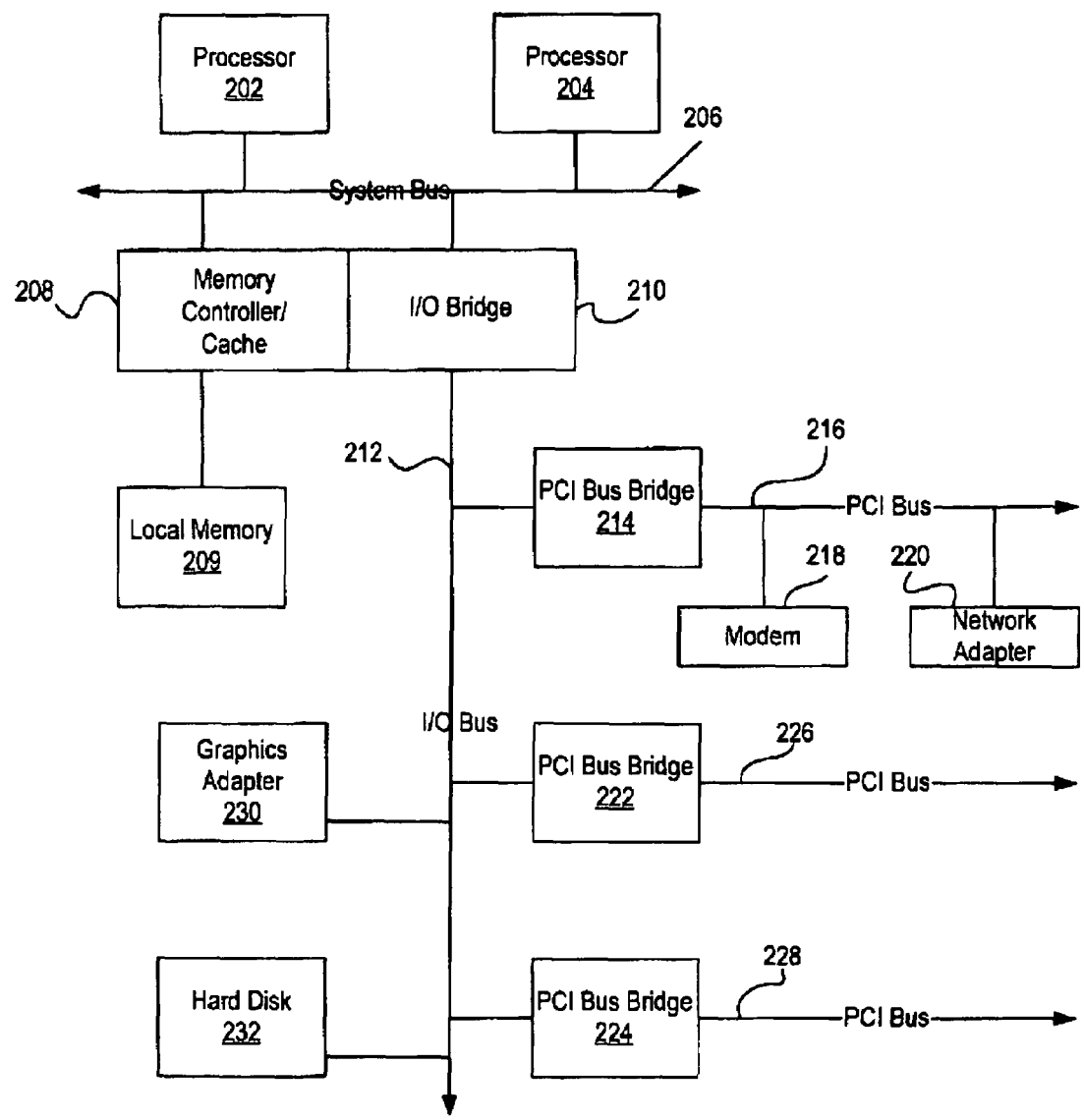
FIGS. 2A-B are block diagrams depicting a data processing system in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
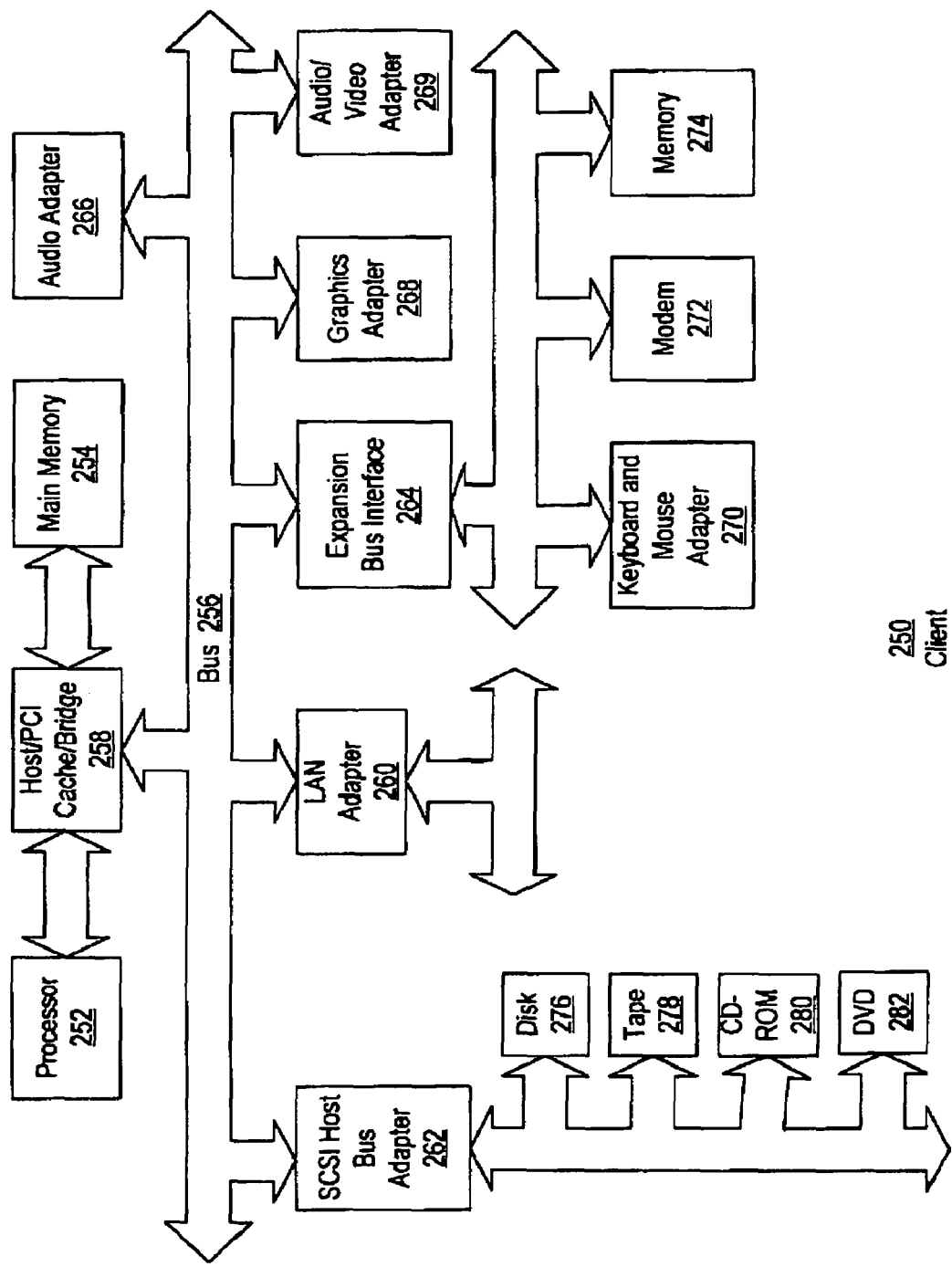

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS for Business™ or OS/2™, which are available from International Business Machines Corporation. JavaOS is loaded from a server on a network to a network client and supports Java programs and applets. A couple of characteristics of JavaOS that are favorable for performing traces with stack unwinds, as described below, are that JavaOS does not support paging or virtual memory. An object-oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for profiling software applications. Although the present invention may operate on a variety of computer platforms and operating systems, it may also operate within a Java runtime environment. Hence, the present invention may operate in conjunction with a Java virtual machine (JVM) yet within the boundaries of a Jvm as defined by Java standard specifications. In order to provide a context for the present invention, portions of the operation of a Jvm according to Java specifications are herein described.

Figure 3A:
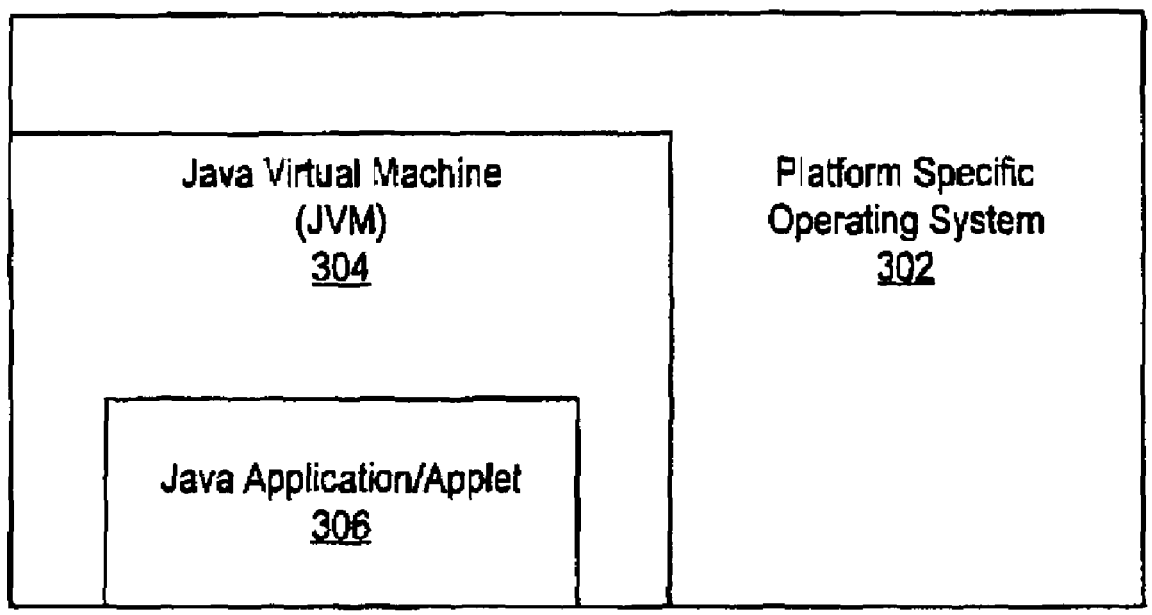
FIG. 3A is a block diagram depicting the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. Jvm 304 is one software application that may execute in conjunction with the operating system. Jvm 304 provides a Java run-time environment with the ability to execute Java application or applet 306, which is a program, servlet, or software component written in the Java programming language. The computer system in which Jvm 304 operates may be similar to data processing system 200 or computer 100 described above. However, Jvm 304 may be implemented in dedicated hardware on a so-called Java chip, Java-on-silicon, or Java processor with an embedded picoJava core.

At the center of a Java run-time environment is the Jvm, which supports all aspects of Java's environment, including its architecture, security features, mobility across networks, and platform independence.

The Jvm is a virtual computer, i.e. a computer that is specified abstractly. The specification defines certain features that every Jvm must implement, with some range of design choices that may depend upon the platform on which the Jvm is designed to execute. For example, all Jvms must execute Java bytecodes and may use a range of techniques to execute the instructions represented by the bytecodes. A Jvm may be implemented completely in software or somewhat in hardware. This flexibility allows different Jvms to be designed for mainframe computers and PDAs.

The Jvm is the name of a virtual computer component that actually executes Java programs. Java programs are not run directly by the central processor but instead by the Jvm, which is itself a piece of software running on the processor. The Jvm allows Java programs to be executed on a different platform as opposed to only the one platform for which the code was compiled. Java programs are compiled for the Jvm. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java run-time system. The Java compiler generates bytecode instructions that are nonspecific to a particular computer architecture. A bytecode is a machine independent-code generated by the Java compiler and executed by a Java interpreter. A Java interpreter is part of the Jvm that alternately decodes and interprets a bytecode or bytecodes. These bytecode instructions are designed to be easy to interpret on any computer and easily translated on the fly into native machine code. Byte codes may be translated into native code by a just-in-time compiler or JIT.

A Jvm must load class files and execute the bytecodes within them. The Jvm contains a class loader, which loads class files from an application and the class files from the Java application programming interfaces (APIs), which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. Jvms usually interpret bytecodes, but Jvms may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code. Profile instrumentation is discussed in more detail further below.

When an application is executed on a Jvm that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
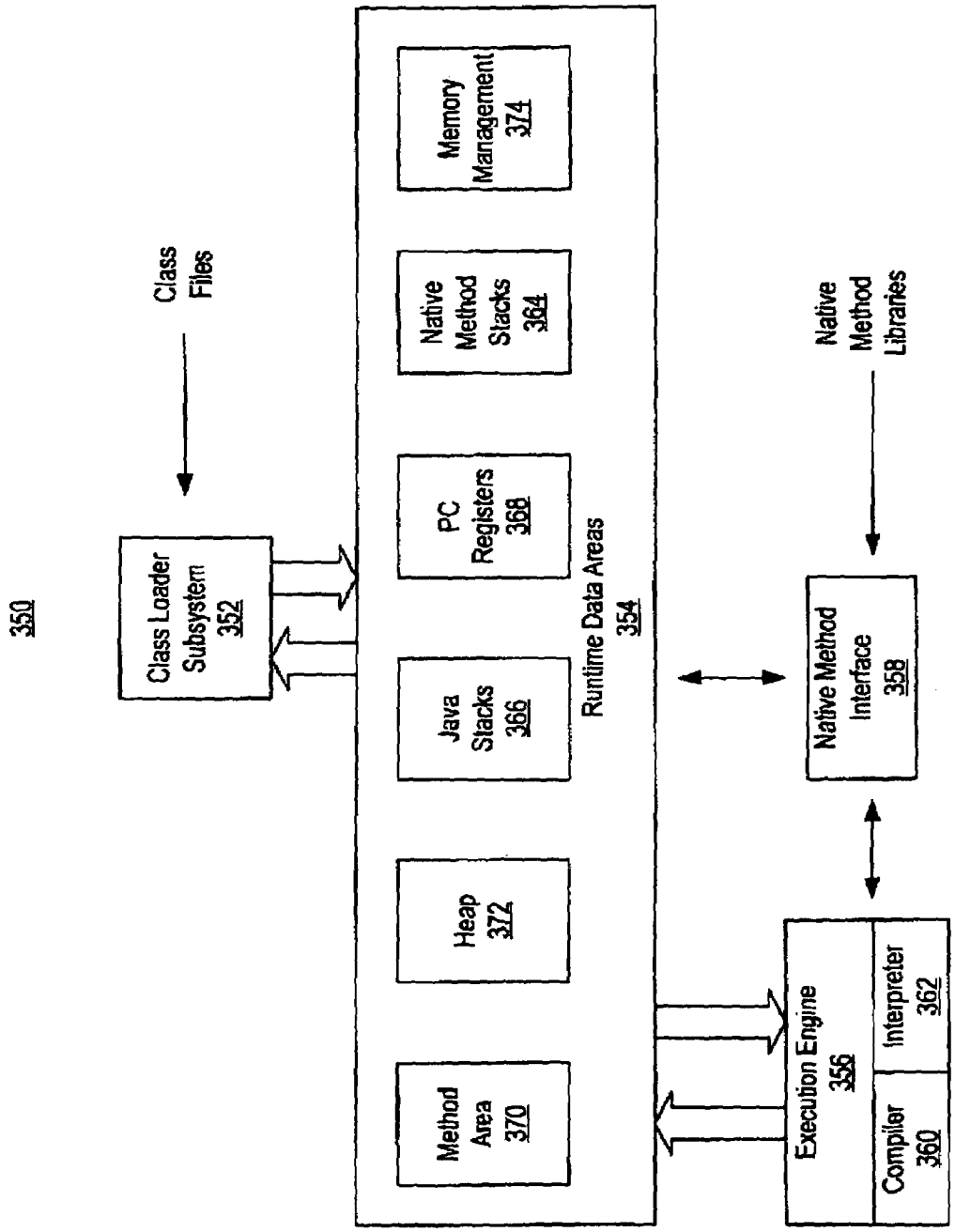
FIG. 3B is a block diagram depicting a Java virtual machine in accordance with a preferred embodiment of the present invention.

With reference now to FIG. 3B, a block diagram of a Jvm is depicted in accordance with a preferred embodiment of the present invention. Jvm 350 includes a class loader subsystem 352, which is a mechanism for loading types, such as classes and interfaces, given fully qualified names. Jvm 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by Jvm 350 to execute a program.

Java stacks 366 are used to store the state of Java method invocations. When a new thread is launched, the Jvm creates a new Java stack for the thread. The Jvm performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the Jvm pushes a new frame onto the Java stack of the thread. When the method completes, the Jvm pops the frame for that method and discards it. The Jvm does not have any registers for holding intermediate values; any Java instruction that requires or produces an intermediate value uses the stack for holding the intermediate values. In this manner, the Java instruction set is well defined for a variety of platform architectures.

PC registers 368 are used to indicate the next instruction to be executed. Each instantiated thread gets its own PC register (program counter) and Java stack. If the thread is executing a Jvm method, the value of the PC register indicates the next instruction to execute. If the thread is executing a native method, then the contents of the PC register are undefined. Native method stacks 364 store the state of invocations of native methods. The state of native method invocations is stored in an implementation-dependent way in native method stacks, registers, or other implementation-dependent memory areas. In some Jvm implementations, native method stacks 364 and Java stacks 366 are combined.

Method area 370 contains class data while heap 372 contains all instantiated objects. The Jvm specification strictly defines data types and operations. Most JVMs choose to have one method area and one heap, each of which are shared by all threads running inside the JVM. When the Jvm loads a class file, it parses information about a type from the binary data contained in the class file. It places this type information into the method area. Each time a class instance or array is created, the memory for the new object is allocated from heap 372. Jvm 350 includes an instruction that allocates memory space within the memory for heap 372 but includes no instruction for freeing that space within the memory. Memory management 374 in the depicted example manages memory space within the memory allocated to heap 370. Memory management 374 may include a garbage collector, which automatically reclaims memory used by objects that are no longer referenced. Additionally, a garbage collector also may move objects to reduce heap fragmentation.

The processes within the following figures provide an overall perspective of the many processes employed within the present invention: processes that generate event-based profiling information in the form of specific types of records in a trace file; processes that generate sample-based profiling information in the form of specific types of records in a trace file; processes that read the trace records to generate more useful information to be placed into profile reports; and processes that generate the profile reports for the user of the profiling utility.

Figure 4:
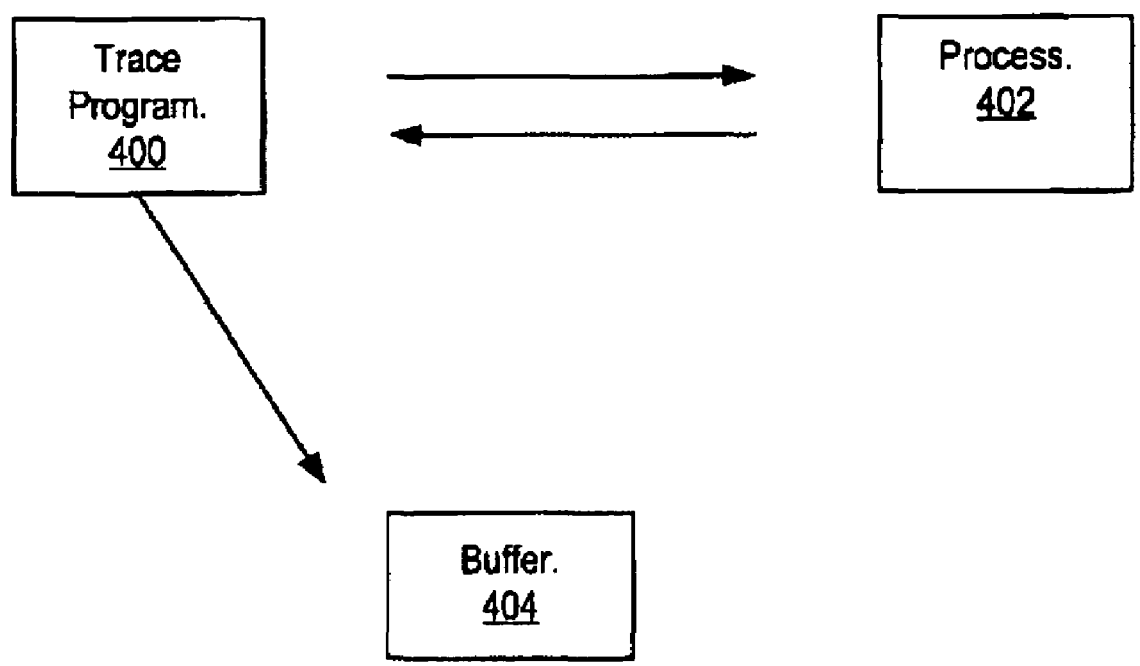
FIG. 4 is a block diagram depicting components used to profile processes in a data processing system.

With reference now to FIG. 4, a block diagram depicts components used to profile processes in a data processing system. A trace program 400 is used to profile processes 402. Trace program 400 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 400, which stores the trace data in buffer 404. The trace data in buffer 404 may be stored in a file for post-processing. With Java operating systems, the present invention employs trace hooks that aid in identifying methods that may be used in processes 402. In addition, since classes may be loaded and unloaded, these changes may also be identified using trace data. This is especially relevant with "network client" data processing systems, such as those that may operate under JavaOS, since classes and jitted methods may be loaded and unloaded more frequently due to the constrained memory and role as a network client.

Figure 5:
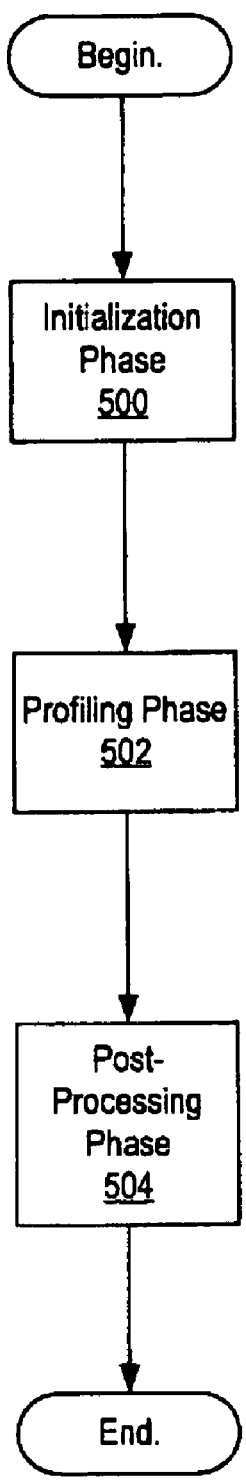
FIG. 5 is an illustration depicting various phases in profiling the active processes in an operating system.

With reference now to FIG. 5, a diagram depicts various phases in profiling the processes active in an operating system. Subject to memory constraints, the generated trace output may be as long and as detailed as the analyst requires for the purpose of profiling a particular program.

An initialization phase 500 is used to capture the state of the client machine at the time tracing is initiated. This trace initialization data includes trace records that identify all existing threads, all loaded classes, and all methods for the loaded classes. Records from trace data captured from hooks are written to indicate thread switches, interrupts, and loading and unloading of classes and jitted methods. Any class, which is loaded, has trace records that indicate the name of the class and its methods. In the depicted example, four byte IDs are used as identifiers for threads, classes, and methods. These IDs are associated with names output in the records. A record is written to indicate when all of the start up information has been written.

Next, during the profiling phase 502, trace records are written to a trace buffer or file. Trace records may originate from two types of profiling actions-event-based profiling and sample-based profiling. In the present invention, the trace file may have a combination of event-based records, such as those that may originate from a trace hook executed in response to a particular type of event, e.g., a method entry or method exit, and sample-based records, such as those that may originate from a stack walking function executed in response to a timer interrupt, e.g., a stack unwind record, also called a call stack record.

For example, the following process may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed.

In the post-processing phase 504, the data collected in the buffer is sent to a file for post-processing. In one configuration, the file may be sent to a server, which determines the profile for the processes on the client machine. Of course, depending on available resources, the post-processing also may be performed on the client machine. In post-processing phase 504, B-trees and/or hash tables may be employed to maintain names associated with the records in the trace file to be processed. A hash table employs hashing to convert an identifier or a key, meaningful to a user, into a value for the location of the corresponding data in the table. While processing trace records, the B-trees and/or hash tables are updated to reflect the current state of the client machine, including newly loaded jitted code or unloaded code. Also, in the post-processing phase 504, each trace record is processed in a serial manner. As soon as the indicator is encountered and all of the startup information has been processed, event-based trace records from trace hooks and sample-based trace records from timer interrupts are then processed. Timer interrupt information from the timer interrupt records are resolved with existing hash tables. In addition, this information identifies the thread and function being executed. The data is stored in hash tables with a count identifying the number of timer tick occurrences associated with each way of looking at the data. After all of the trace records are processed, the information is formatted for output in the form of a report.

Alternatively, trace information may be processed on the fly so that trace data structures are maintained during the profiling phase. In other words, while a profiling function, such as a timer interrupt, is executing, rather than (or in addition to) writing trace records to a buffer or file, the trace record information is processed to construct and maintain any appropriate data structures.

For example, during the processing of a timer interrupt during the profiling phase, a determination could be made as to whether the code being interrupted is being interpreted by the Java interpreter. If the code being interrupted is interpreted, the method ID of the method being interpreted may be placed in the trace record. In addition, the name of the method may be obtained and placed in the appropriate B-tree. Once the profiling phase has completed, the data structures may contain all the information necessary for generating a profile report without the need for post-processing of the trace file.

Figure 6:
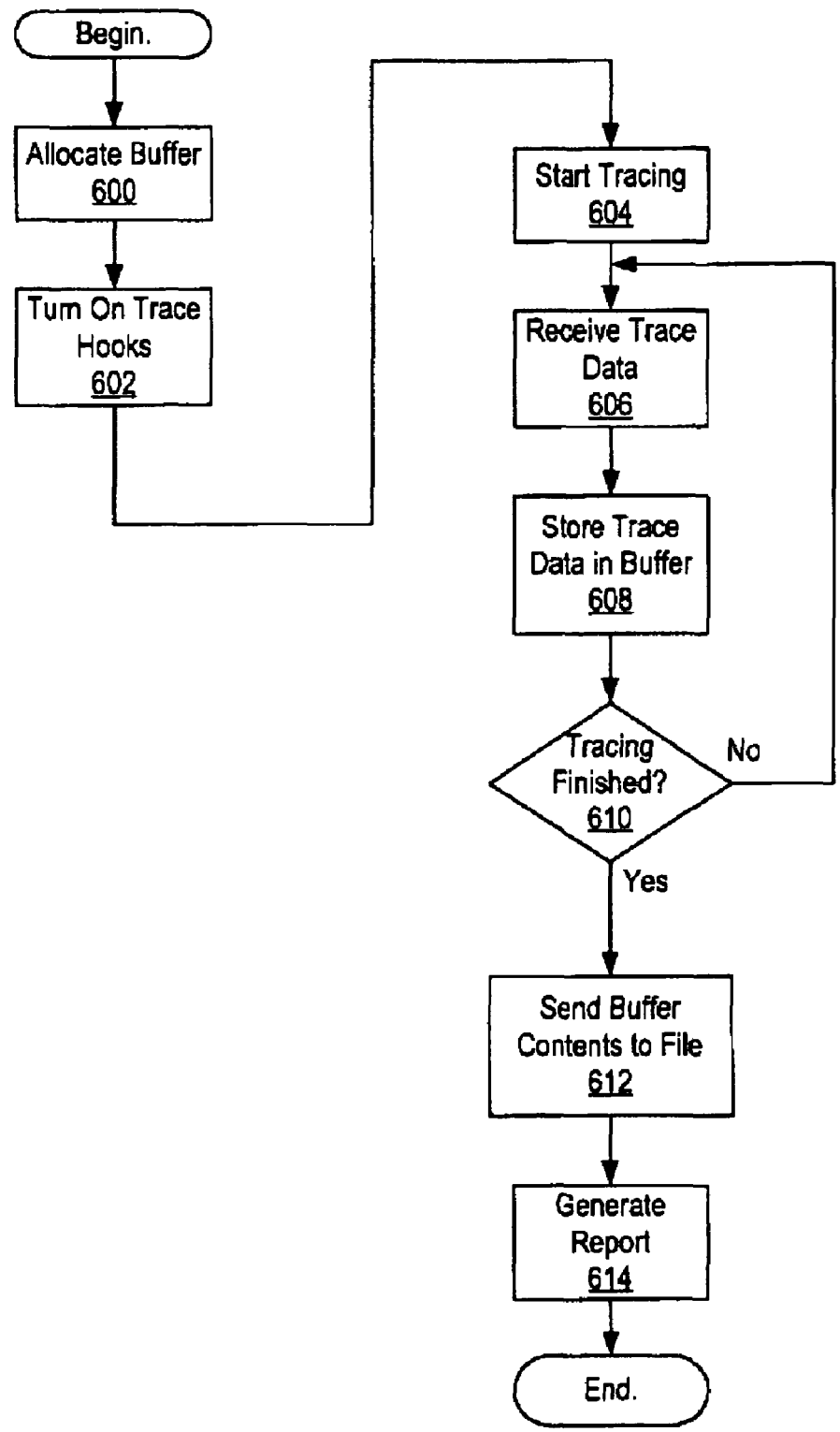
FIG. 6 is a flowchart depicting a process used by a trace program for generating trace records from processes executing on a data processing system.

With reference now to FIG. 6, a flowchart depicts a process used by a trace program for generating trace records from processes executing on a data processing system. FIG. 6 provides further detail concerning the generation of trace records that were not described with respect to FIG. 5.

Trace records may be produced by the execution of small pieces of code called "hooks". Hooks may be inserted in various ways into the code executed by processes, including statically (source code) and dynamically (through modification of a loaded executable). This process is employed after trace hooks have already been inserted into the process or processes of interest. The process begins by allocating a buffer (step 600), such as buffer 404 in FIG. 4. Next, in the depicted example, trace hooks are turned on (step 602), and tracing of the processes on the system begins (step 604). Trace data is received from the processes of interest (step 606). This type of tracing may be performed during phases 500 and/or 502. This trace data is stored as trace records in the buffer (step 608). A determination is made as to whether tracing has finished (step 610). Tracing finishes when the trace buffer has been filled or the user stops tracing via a command and requests that the buffer contents be sent to file. If tracing has not finished, the process returns to step 606 as described above.

Otherwise, when tracing is finished, the buffer contents are sent to a file for post-processing (step 612). A report is then generated in post-processing (step 614) with the process terminating thereafter.

Although the depicted example uses post-processing to analyze the trace records, the processes of the present invention may be used to process trace information in real-time depending on the implementation.

Figure 7:
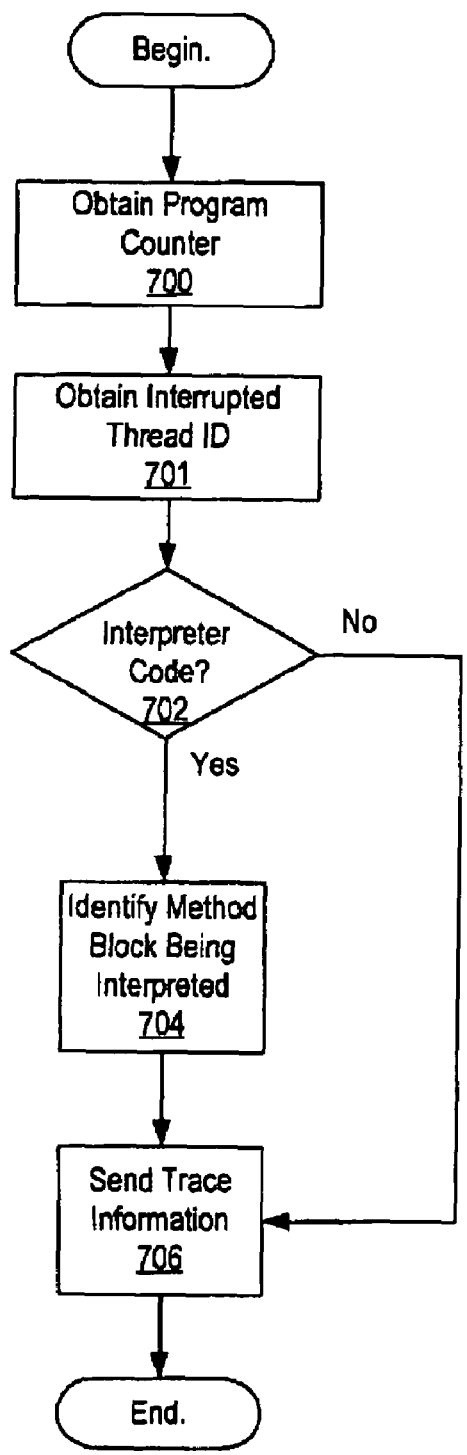
FIG. 7 is a flowchart depicting a process used in a system interrupt handler trace hook.

With reference now to FIG. 7, a flowchart depicts a process that may be used during an interrupt handler trace hook.

The process begins by obtaining a program counter (step 700). Typically, the program counter is available in one of the saved program stack areas. Thereafter, a determination is made as to whether the code being interrupted is interpreted code (step 702). This determination may be made by determining whether the program counter is within an address range for the interpreter used to interpret bytecodes. If the code being interrupted is interpreted, a method block address is obtained for the code being interpreted. A trace record is then written (step 706). The trace record is written by sending the trace information to a trace program, such as trace program 400, which generates trace records for post-processing in the depicted example. This trace record is referred to as an interrupt record, or an interrupt hook.

This type of trace may be performed during phase 502. Alternatively, a similar process, i.e. determining whether code that was interrupted is interpreted code, may occur during post-processing of a trace file.

Figure 8:
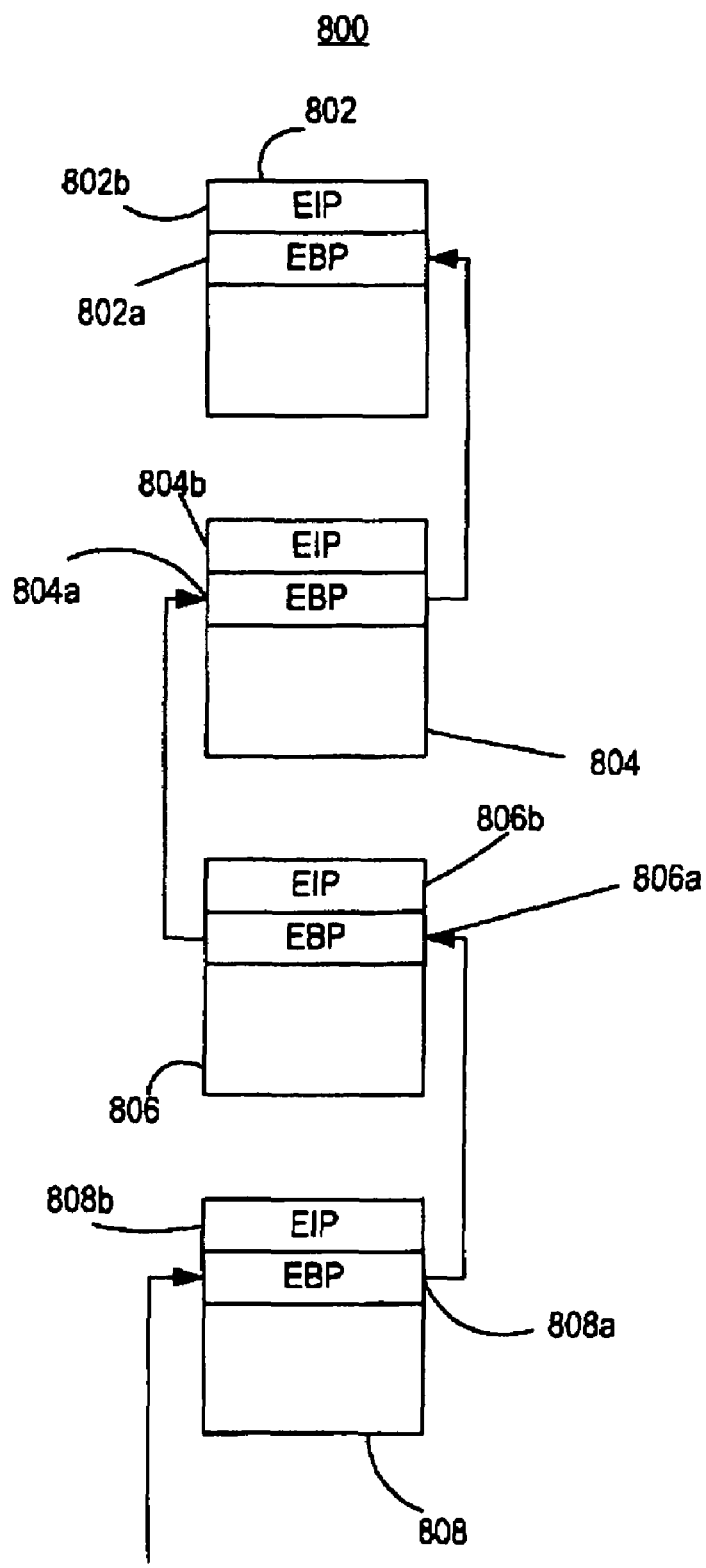
FIG. 8 is a diagram depicting the call stack containing stack frames.
Figure 9:
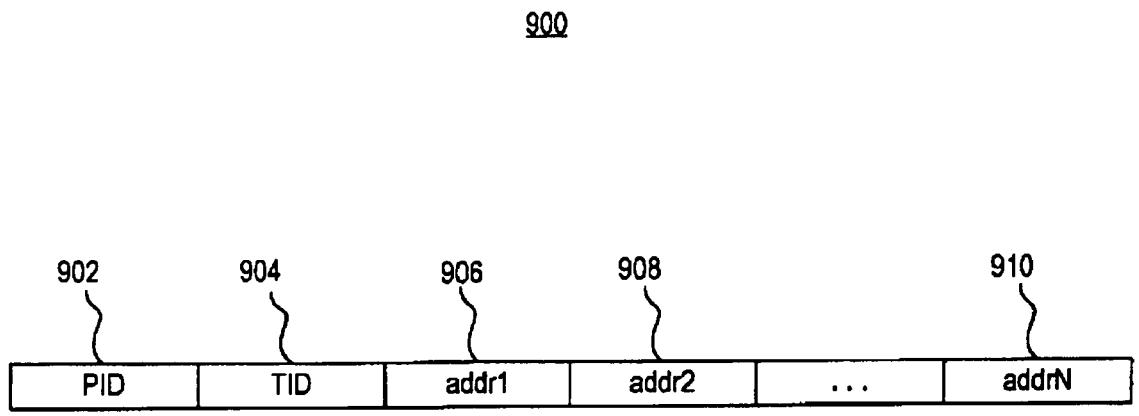
FIG. 9 is an illustration depicting a call stack sample.

In addition to event-based profiling, a set of processes may be employed to obtain sample-based profiling information. As applications execute, the applications may be periodically interrupted in order to obtain information about the current runtime environment. This information may be written to a buffer or file for post-processing, or the information may be processed on the fly into data structures representing an ongoing history of the runtime environment. FIGS. 8 and 9 describe sample-based profiling in more detail.

A sample-based profiler obtains information from the stack of an interrupted thread. The thread is interrupted by a timer interrupt presently available in many operating systems. The user of the trace facility selects either the program counter option or the stack unwind option, which may be accomplished by enabling one major code or another major code, as described further below. This timer interrupt is employed to sample information from a call stack. By walking back up the call stack, a complete call stack can be obtained for analysis. A "stack walk" may also be described as a "stack unwind", and the process of "walking the stack" may also be described as "unwinding the stack". Each of these terms illustrates a different metaphor for the process. The process can be described as "walking" as the process must obtain and process the stack frames step-by-step. The process may also be described as "unwinding" as the process must obtain and process the stack frames that point to one another, and these pointers and their information must be "unwound" through many pointer dereferences.

The stack unwind follows the sequence of functions/ method calls at the time of the interrupt. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during timer interrupt processing or at post-processing, the generated sample-based profile information reflects a sampling of call stacks, not just leaves of the possible call stacks, as in some program counter sampling techniques. A leaf is a node at the end of a branch, i.e. a node that has no descendants. A descendant is a child of a parent node, and a leaf is a node that has no children.

With reference now to FIG. 8, a diagram depicts the call stack containing stack frames. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls— in other words, it reflects the function invocation sequence at any point in time. Call stack 800 includes information identifying the routine that is currently running, the routine that invoked it, and so on all the way up to the main program. Call stack 800 includes a number of stack frames 802, 804, 806, and 808. In the depicted example, stack frame 802 is at the top of call stack 800, while stack frame 808 is located at the bottom of call stack 800. The top of the call stack is also referred to as the "root". The timer interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame). By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architecture, this example is not a restriction. Most architectures employ linkage conventions that can be similarly navigated by a modified profiling interrupt handler.

When a timer interrupt occurs, the first parameter acquired is the program counter value. The next value is the pointer to the top of the current stack frame for the interrupted thread. In the depicted example, this value would point to EBP 808a in stack frame 808. In turn, EBP 808 points to EBP 806a in stack frame 806, which in turn points to EBP 804a in stack frame 804. In turn, this EBP points to EBP 802a in stack frame 802. Within stack frames 802-808 are EIPs 802b-808b, which identify the calling routine's return address. The routines may be identified from these addresses. Thus, routines are defined by collecting all of the return addresses by walking up or backwards through the stack.

With reference now to the FIG. 9, an illustration of a call stack is depicted. A call stack, such as call stack 900 is obtained by walking the call stack. A call stack is obtained each time a periodic event, such as, for example, a timer interrupt occurs. These call stacks may be stored as call stack unwind trace records within the trace file for post-processing or may be processed on-the-fly while the program continues to execute. In the depicted example, call stack 900 contains a pid 902, which is the process identifier, and a tid 904, which is the thread identifier. Call stack 900 also contains addresses addr1 906, addr2 908 . . . addrN 910. In this example, addr1 906 represents the value of the program counter at the time of the interrupt. This address occurs somewhere within the scope of the interrupted function. addr2 908 represents an address within the process that called the function that was interrupted. For Intel-processor-based data processing systems, it represents the return address for that call; decrementing that value by 4 results in the address of the actual call, also known as the call-site. This corresponds with EIP 808b in FIG. 8; addrN 910 is the top of the call stack (EIP 802b). The call stack that would be returned if the timer interrupt interrupted the thread whose call stack state is depicted in FIG. 8 would consist of: a pid, which is the process id of the interrupted thread; a tid, which is the thread id for the interrupted thread; a pcv, which is a program counter value (not shown on FIG. 8) for the interrupted thread; EIP 808b; EIP 806b; EIP 804b; and EIP 802b. In terms of FIG. 9, pcv=addr1, EIP 808b=addr2, EIP 806b=addr3, EIP 804b=addr4, EIP 802b=addr5.

With reference now to FIG. 10A, a diagram of a program execution sequence along with the state of the call stack at each function entry/exit point is provided. The illustration shows entries and exits occurring at regular time intervals, but this is only a simplification for the illustration. If each function (A, B, C, and X in the figure) were instrumented with entry/exit event hooks, then complete accounting of the time spent within and below each function would be readily obtained. Note in FIG. 10A that at time 0, the executing thread is in routine C. The call stack at time 0 is C. At time 1, routine C calls routine A, and the call stack becomes CA and so on. It should be noted that the call stack in FIG. 10A is a reconstructed call stack that is generated by processing the event-based trace records in a trace file to follow such events as method entries and method exits.

The accounting technique and data structure is described in more detail further below. Unfortunately, this type of instrumentation can be expensive, can introduce bias, and in some cases, can be hard to apply. Sample-based profiling, by sampling the program's call stack, helps to alleviate the performance bias (and other complications) that entry/exit hooks produce.

Consider FIG. 10B, in which the same program is executed but is being sampled on a regular basis (in the example, the interrupt occurs at a frequency equivalent to two timestamp values). Each sample includes a snapshot of the interrupted thread's call stack. Not all call stack combinations are seen with this technique (note that routine X does not show up at all in the set of call stack samples in FIG. 10B). This is an acceptable limitation of sampling. The idea is that with an appropriate sampling rate (e.g., 30-1000 times per second), the call stacks in which most of the time is spent will be identified. Although some call stacks are omitted, it is a minor issue provided these call stacks are combinations for which little time is consumed.

In the event-based traces, there is a fundamental assumption that the traces contain information about routine entries and matching routine exits. Often, entry-exit pairs are nested in the traces because routines call other routines. Time spent (or memory consumed) between entry into a routine and exit from the same routine is attributed to that routine, but a user of a profiling tool may want to distinguish between time spent directly in a routine and time spent in other routines that it calls.

FIG. 10C shows an example of the manner in which time may be expended by two routines: a program's "main" calls routine A at time "t" equal to zero; routine A computes for 1 ms and then calls routine B; routine B computes for 8 ms and then returns to routine A; routine A computes for 1 ms and then returns to "main". From the point of view of "main", routine A took 10 ms to execute, but most of that time was spent executing instructions in routine B and was not spent executing instructions within routine A. This is a useful piece of information for a person attempting to optimize the example program. In addition, if routine B is called from many places in the program, it might be useful to know how much of the time spent in routine B was on behalf of (or when called by) routine A and how much of the time was on behalf of other routines.

A fundamental concept in the output provided by the methods described herein is the call stack. The call stack consists of the routine that is currently running, the routine that invoked it, and so on all the way up to main. A profiler may add a higher, thread level with the pid/tid (the process IDs and thread IDs). In any case, an attempt is made to follow the trace event records, such as method entries and exits, as shown in FIG. 10A, to reconstruct the structure of the call stack frames while the program was executing at various times during the trace.

The post-processing of a trace file may result in a report consisting of three kinds of time spent in a routine, such as routine A: (1) base time—the time spent executing code in routine A itself; (2) cumulative time (or "cum time" for short)—the time spent executing in routine A plus all the time spent executing every routine that routine A calls (and all the routines they call, etc.); and (3) wall-clock time or elapsed time. This type of timing information may be obtained from event-based trace records as these records have timestamp information for each record.

A routine's cum time is the sum of all the time spent executing the routine plus the time spent executing any other routine while that routine is below it on the call stack. In the example above in FIG. 10C, routine A's base time is 2 ms, and its cum time is 10 ms. Routine B's base time is 8 ms, and its cum time is also 8 ms because it does not call any other routines. It should be noted that cum time may not be generated if a call stack tree is being generated on the fly—cum time may only be computed after the fact during the post-processing phase of a profile utility.

For wall-clock or elapsed time, if while routine B was running, the system fielded an interrupt or suspended this thread to run another thread, or if routine B blocked waiting on a lock or I/O, then routine B and all the entries above routine B on the call stack accumulate elapsed time but not base or cum time. Base and cum time are unaffected by interrupts, dispatching, or blocking. Base time only increases while a routine is running, and cum time only increases while the routine or a routine below it on the call stack is running.

In the example in FIG. 10C, routine A's elapsed time is the same as its cum time—10 ms. Changing the example slightly, suppose there was a 1 ms interrupt in the middle of B, as shown in FIG. 10D. Routine A's base and cum time are unchanged at 2 ms and 10 ms, but its elapsed time is now 11 ms.

Although base time, cum time and elapsed time were defined in terms of processor time spent in routines, sample based profiling is useful for attributing consumption of almost any system resource to a set of routines, as described in more detail below with respect to FIG. 11B. Referring to FIG. 10C again, if routine A initiated two disk I/O's, and then routine B initiated three more I/O's when called by routine A, routine A's "base I/O's" are two and routine A's "cum I/O's" are five. "Elapsed I/O's" would be all I/O's, including those by other threads and processes, which occurred between entry to routine A and exit from routine A. More general definitions for the accounting concepts during profiling would be the following: base—the amount of the tracked system resource consumed directly by this routine; cum—the amount of the tracked system resource consumed by this routine and all routines below it on the call stack; elapsed—the total amount of the tracked system resource consumed (by any routine) between entry to this routine and exit from the routine.

As noted above, FIGS. 10A-10D describe the process by which a reconstructed call stack may be generated by processing the event-based trace records in a trace file by following such events as method entries and method exits. Hence, although FIGS. 11A-14 describe call stack trees that may be applicable to processing sample-based trace records, the description below for generating or reconstructing call stacks and call stack trees in FIGS. 11A-14 is mainly directed to the processing of event-based trace records.

Figure 11A:
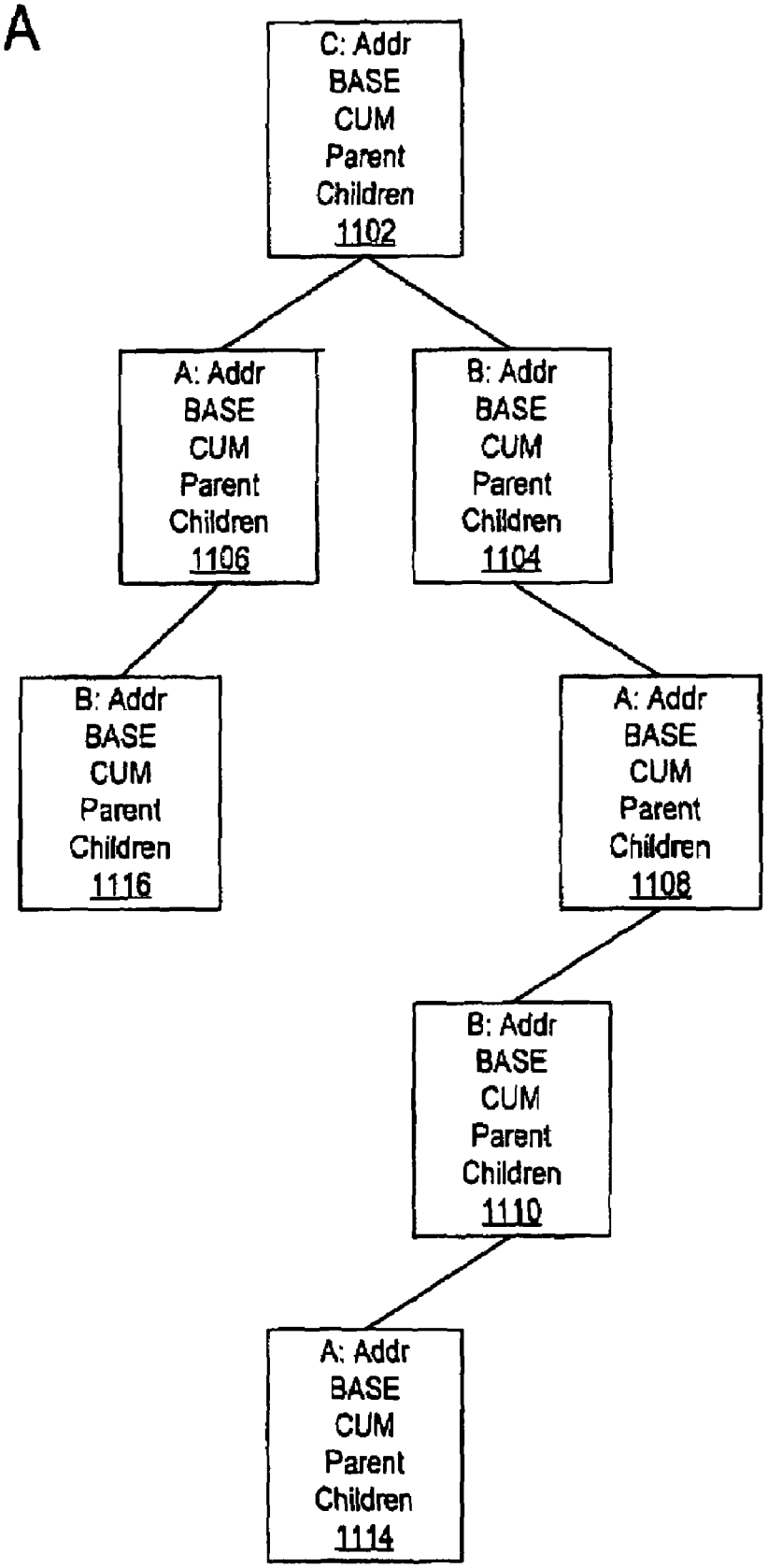
FIG. 11A is a diagram depicting a tree structure generated from sampling a call stack.

With reference now to FIG. 11A, a diagram depicts a tree structure generated from trace data. This figure illustrates a call stack tree 1100 in which each node in tree structure 1100 represents a function entry point. Additionally, in each node in tree structure 1100, a number of statistics are recorded. In the depicted example, each node, nodes 1102-1108, contains an address (addr), a base time (BASE), cumulative time (CUM) and parent and children pointers. As noted above, this type of timing information may be obtained from event-based trace records as these records have timestamp information for each record. The address represents a function entry point. The base time represents the amount of time consumed directly by this thread executing this function. The cumulative time is the amount of time consumed by this thread executing this function and all functions below it on the call stack. In the depicted example, pointers are included for each node. One pointer is a parent pointer, a pointer to the node's parent. Each node also contains a pointer to each child of the node.

Those of ordinary skill in the art will appreciate that tree structure 1100 may be implemented in a variety of ways and that many different types of statistics may be maintained at the nodes other than those in the depicted example.

The call stack is developed from looking back at all return addresses. These return addresses will resolve within the bodies of those functions. This information allows for accounting discrimination between distinct invocations of the same function. In other words, if function X has 2 distinct calls to function A, the time associated with those calls can be accounted for separately. However, most reports would not make this distinction.

Figure 11B:
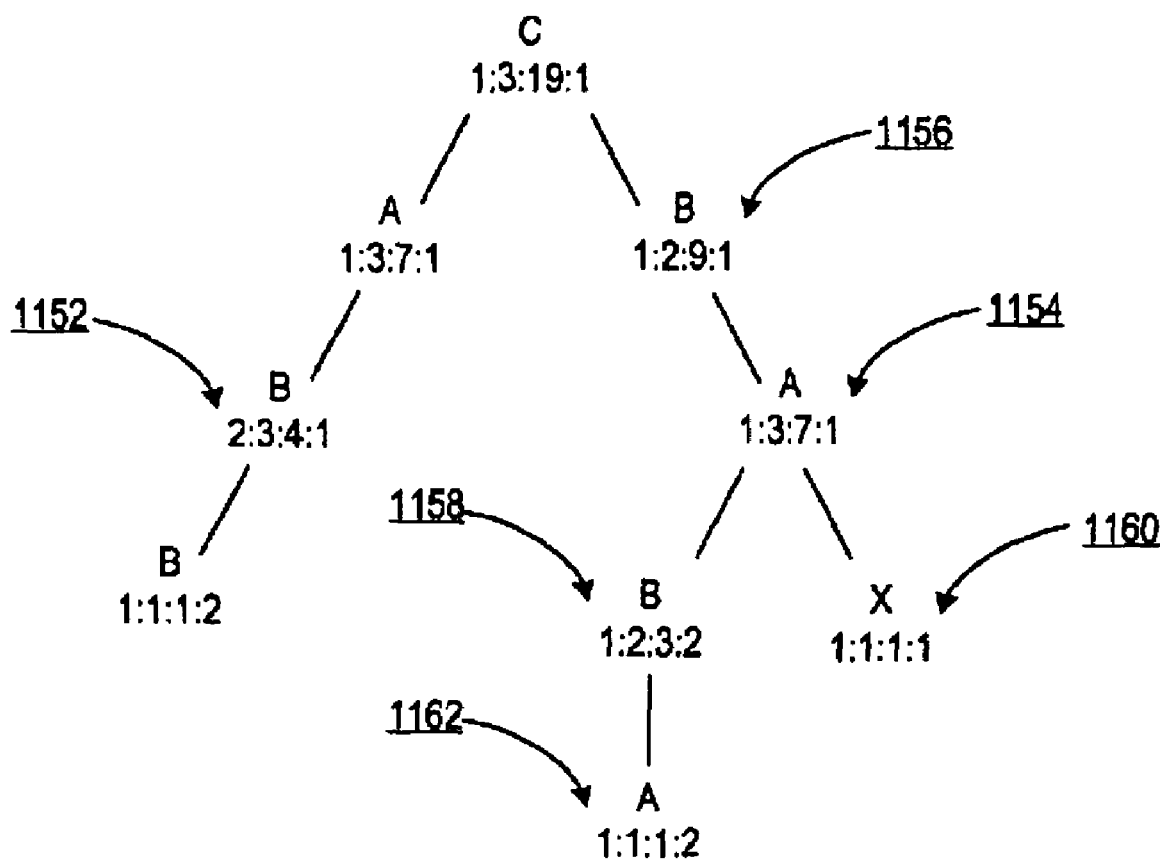
FIG. 11B is a diagram depicting an event tree, which reflects call stacks observed during system execution.

With reference now to FIG. 11B, a call stack tree which reflects call stacks observed during a specific example of system execution will now be described. At each node in the tree, several statistics are recorded. In the example shown in FIG. 11B, the statistics are time-based statistics. The particular statistics shown include the number of distinct times the call stack is produced, the sum of the time spent in the call stack, the total time spent in the call stack plus the time in those call stacks invoked from this call stack (referred to as cumulative time), and the number of instances of this routine above this instance (indicating depth of recursion).

For example, at node 1152 in FIG. 11B, the call stack is CAB, and the statistics kept for this node are 2:3:4:1. Note that call stack CAB is first produced at time 2 in FIG. 10A, and is exited at time 3. Call stack CAB is produced again at time 4, and is exited at time 7. Thus, the first statistic indicates that this particular call stack, CAB, is produced twice in the trace. The second statistic indicates that call stack CAB exists for three units of time (at time 2, time 4, and time 6). The third statistic indicates the cumulative amount of time spent in call stack CAB and those call stacks invoked from call stack CAB (i.e., those call stacks having CAB as a prefix, in this case CABB). The cumulative time in the example shown in FIG. 11B is four units of time. Finally, the recursion depth of call stack CAB is one, as none of the three routines present in the call stack have been recursively entered.

Those skilled in the art will appreciate that the tree structure depicted in FIG. 11B may be implemented in a variety of ways, and a variety of different types of statistics may be maintained at each node. In the described embodiment, each node in the tree contains data and pointers. The data include the name of the routine at that node, and the four statistics discussed above. Of course, many other types of statistical information may be stored at each node. In the described embodiment, the pointers for each node include a pointer to the node's parent, a pointer to the first child of the node (i.e. the left-most child), a pointer to the next sibling of the node, and a pointer to the next instance of a given routine in the tree. For example, in FIG. 11B, node 1154 would contain a parent pointer to node 1156, a first child pointer to node 1158, a next sibling pointer equal to NULL (note that node 1154 does not have a next sibling), and a next instance pointer to node 1162. Those skilled in the art will appreciate that other pointers may be stored to make subsequent analysis more efficient. In addition, other structural elements, such as tables for the properties of a routine that are invariant across instances (e.g., the routine's name), may also be stored.

The type of performance information and statistics maintained at each node are not constrained to time-based performance statistics. The present invention may be used to present many types of trace information in a compact manner, which supports performance queries. For example, rather than keeping statistics regarding time, tracing may be used to track the number of Java bytecodes executed in each method (i.e., routine) called. The tree structure of the present invention would then contain statistics regarding bytecodes executed rather than time. In particular, the quantities recorded in the second and third categories would reflect the number of bytecodes executed rather than the amount of time spent in each method.

Tracing may also be used to track memory allocation and deallocation. Every time a routine creates an object, a trace record could be generated. The tree structure of the present invention would then be used to efficiently store and retrieve information regarding memory allocation. Each node would represent the number of method calls, the amount of memory allocated within a method, the amount of memory allocated by methods called by the method, and the number of methods above this instance (i.e., the measure of recursion). Those skilled in the art will appreciate that the tree structure of the present invention may be used to represent a variety of performance data in a manner which is very compact, and allows a wide variety of performance queries to be performed.

The tree structure shown in FIG. 11B depicts one way in which data may be pictorially presented to a user. The same data may also be presented to a user in tabular form as shown in FIG. 12.

With reference now to FIG. 12, a call stack tree presented as a table will now be described. Note that FIG. 12 contains a routine, pt_pidtid, which is the main process/thread, which calls routine C. Table 12 includes columns of data for Level 1230, RL 1232, Calls 1234, Base 1236, Cum 1238, and Indent 1240. Level 1230 is the tree level (counting from the root as level 0) of the node. RL 1232 is the recursion level. Calls 1234 is the number of occurrences of this particular call stack, i.e., the number of times this distinct call stack configuration occurs. Base 1236 is the total observed time in the particular call stack, i.e., the total time that the stack had exactly these routines on the stack. Cum 1238 is the total time in the particular call stack plus deeper levels below it. Indent 1240 depicts the level of the tree in an indented manner. From this type of call stack configuration information, it is possible to infer each unique call stack configuration, how many times the call stack configuration occurred, and how long it persisted on the stack. This type of information also provides the dynamic structure of a program, as it is possible to see which routine called which other routine. However, there is no notion of time-order in the call stack tree. It cannot be inferred that routines at a certain level were called before or after other routines on the same level.

Figure 13:
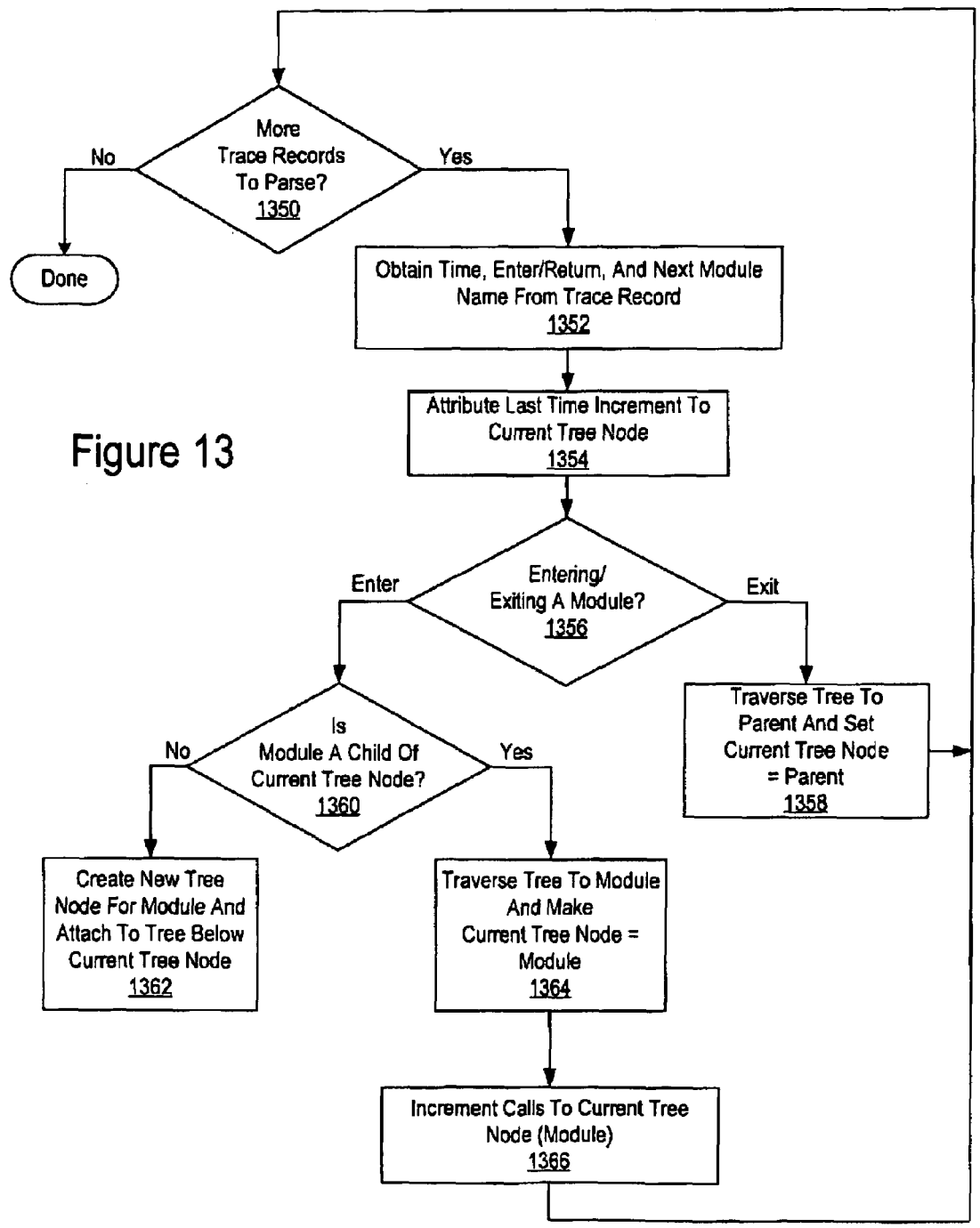
FIG. 13 is a flow chart depicting a method for building a call stack tree using a trace text file as input.

The pictorial view of the call stack tree, as illustrated in FIG. 11B, may be built dynamically or built statically using a trace text file or binary file as input. FIG. 13 depicts a flow chart of a method for building a call stack tree using a trace text file as input. In FIG. 13, the call stack tree is built to illustrate module entry and exit points.

With reference now to FIG. 13, it is first determined if there are more trace records in the trace text file (step 1350). If so, several pieces of data are obtained from the trace record, including the time, whether the event is an enter or an exit, and the module name (step 1352). Next, the last time increment is attributed to the current node in the tree (step 1354). A check is made to determine if the trace record is an enter or an exit record (step 1356). If it is an exit record, the tree is traversed to the parent (using the parent pointer), and the current tree node is set equal to the parent node (step 1358). If the trace record is an enter record, a check is made to determine if the module is already a child node of the current tree node (step 1360). If not, a new node is created for the module and it is attached to the tree below the current tree node (step 1362). The tree is then traversed to the module's node, and the current tree node is set equal to the module node (step 1364). The number of calls to the current tree node is then incremented (step 1366). This process is repeated for each trace record in the trace output file, until there are no more trace records to parse (step 1368).

Figure 14:
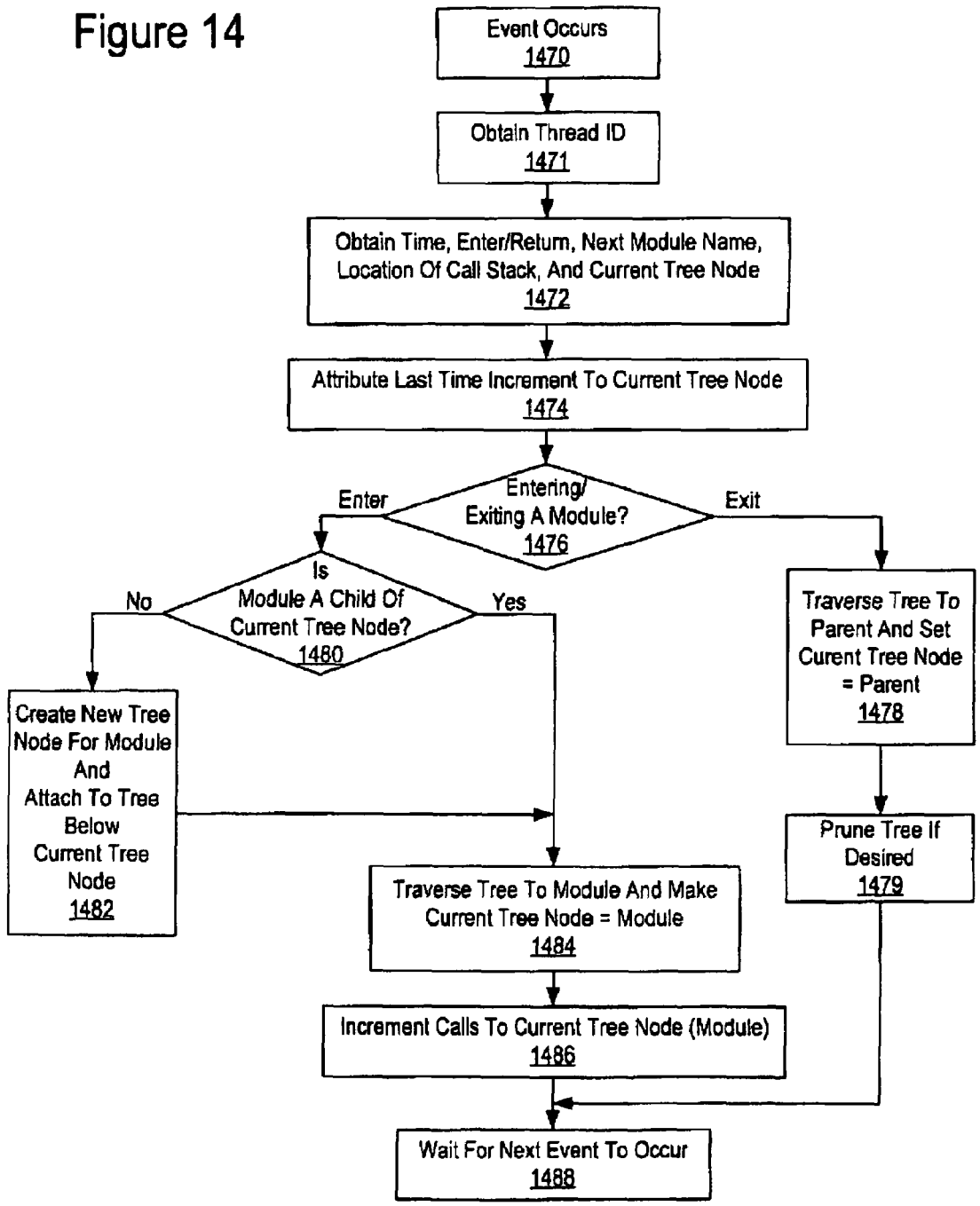
FIG. 14 is a flow chart depicting a method for building a call stack tree dynamically as tracing is taking place during system execution.

With reference now to FIG. 14, a flow chart depicts a method for building a call stack tree dynamically as tracing is taking place during system execution. In FIG. 14, as an event is logged, it is added to the tree in real time. Preferably, a call stack tree is maintained for each thread. The call stack tree reflects the call stacks recorded to date, and a current tree node field indicates the current location in a particular tree. When an event occurs (step 1470), the thread ID is obtained (step 1471). The time, type of event (i.e., in this case, whether the event is a method entry or exit), the name of the module (i.e., method), location of the thread's call stack, and location of the thread's "current tree node" are then obtained (step 1472). The last time increment is attributed to the current tree node (step 1474). A check is made to determine if the trace event is an enter or an exit event (step 1476). If it is an exit event, the tree is traversed to the parent (using the parent pointer), and the current tree node is set equal to the parent node (step 1478). At this point, the tree can be dynamically pruned in order to reduce the amount of memory dedicated to its maintenance (step 1479). Pruning is discussed in more detail below. If the trace event is an enter event, a check is made to determine if the module is already a child node of the current tree node (step 1480). If not, a new node is created for the module, and it is attached to the tree below the current tree node (step 1482). The tree is then traversed to the module's node, and the current tree node is set equal to the module node (step 1484). The number of calls to the current tree node is then incremented (step 1486). Control is then passed back to the executing module, and the dynamic tracing/reduction program waits for the next event to occur (step 1488).

One of the advantages of using the dynamic tracing/reduction technique described in FIG. 14 is its enablement of long-term system trace collection with a finite memory buffer. Very detailed performance profiles may be obtained without the expense of an "infinite" trace buffer. Coupled with dynamic pruning, the method depicted in FIG. 14 can support a fixed-buffer-size trace mechanism.

The use of dynamic tracing and reduction (and dynamic pruning in some cases) is especially useful in profiling the performance characteristics of long running programs. In the case of long running programs, a finite trace buffer can severely impact the amount of useful trace information that may be collected and analyzed. By using dynamic tracing and reduction (and perhaps dynamic pruning), an accurate and informative performance profile may be obtained for a long running program.

Many long-running applications reach a type of steady-state, where every possible routine and call stack is present in the tree and updating statistics. Thus, trace data can be recorded and stored for such applications indefinitely within the constraints of a bounded memory requirement using dynamic pruning. Pruning has value in reducing the memory requirement for those situations in which the call stacks are actually unbounded. For example, unbounded call stacks are produced by applications that load and run other applications.

Pruning can be performed in many ways, and a variety of pruning criteria is possible. For example, pruning decisions may be based on the amount of cumulative time attributed to a subtree. Note that pruning may be disabled unless the amount of memory dedicated to maintaining the call stack exceeds some limit. As an exit event is encountered (such as step 1478 in FIG. 14), the cumulative time associated with the current node is compared with the cumulative time associated with the parent node. If the ratio of these two cumulative times does not exceed a pruning threshold (e.g., 0.1), then the current node and all of its descendants are removed from the tree. The algorithm to build the tree proceeds as before by traversing to the parent, and changing the current node to the parent.

Many variations of the above pruning mechanism are possible. For example, the pruning threshold can be raised or lowered to regulate the level of pruning from very aggressive to none. More global techniques are also possible, including a periodic sweep of the entire call stack tree, removing all subtrees whose individual cumulative times are not a significant fraction of their parent node's cumulative times.

Data reduction allows analysis programs to easily and quickly answer many questions regarding how computing time was spent within the traced program. This information may be gathered by "walking the tree" and accumulating the data stored at various nodes within the call stack tree, from which it can be determined the amount of time spent strictly within routine A, the total amount of time spent in routine A and in the routines called by routine A either directly or indirectly, etc.

Figure 15A:
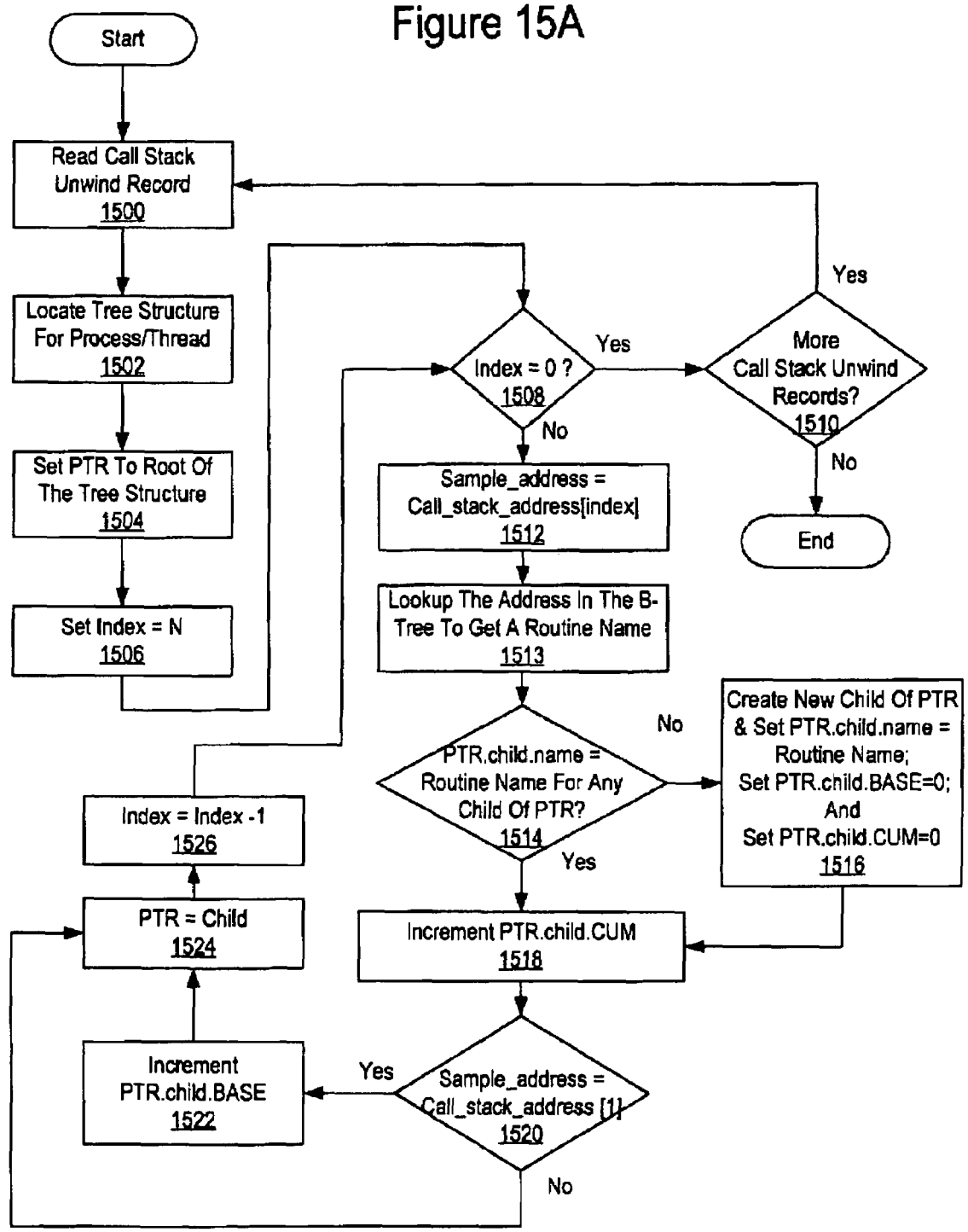
FIG. 15A is a flowchart depicting a process for creating a call stack tree structure from call stack unwind records in a trace file.

With reference now to FIG. 15A, a flowchart depicts a process for creating a call stack tree structure from call stack unwind records in a trace file. FIGS. 10A-14 above primarily showed the processes involved in generating a call stack tree from event-based trace records, which show events such as method entries and method exits. These types of trace records allow a call stack to be generated, usually during a postprocessing phase of the profile tool or utility. Using timer interrupts, a profiling function may walk an active call stack to generate a call stack unwind trace record. FIG. 15A describes a process for combining the information in a call stack unwind trace record into a call stack tree. The call stack tree may have been previously constructed from other call stack unwind trace records or from event-based trace records according to the methods described in FIGS. 10A-14.

The process begins by reading a call stack unwind record (step 1500). This step processes the call stack information in the record to determine what routines are or were executing when the timer interrupt occurs or occurred, depending on whether the call stack unwind record is being processed on-the-fly or is being postprocessed. A sample-based profiling function avoids, through the call stack unwind, the need for adding additional instructions to the program, which affects the performance and time spent in routines. Next, the tree structure for this process/thread (pid, tid) is located (step 1502). Then, the pointer (PTR) is set to the root of this tree structure by setting PTR=root(pid, tid) (step 1504). The index is set equal to N, which is the number of entries in the call stack (step 1506).

A determination is made as to whether the index is equal to zero (step 1508). If the index is equal to zero, the process then returns to determine whether additional call stack unwind trace records are present for processing (step 1510). If additional call stack unwind trace records are present, the process then returns to step 1500 to read another call stack unwind trace record. Otherwise, the process terminates.

On the other hand, if the index is not equal to zero, the process then sets sample_address equal to the call_stack_address[index] (step 1512). The B-tree is then used to lookup the address to get a routine name (step 1513). Next, a determination is made as to whether PTR.child.name for any child of PTR is equal to the looked-up routine name (step 1514). In other words, this step determines whether the routine name has ever been seen at this level in the tree structure. If the address has never been seen at this level in the tree structure, a new child of PTR is created and the PTR.child.name is set equal to the routine name, the variable PTR.child.BASE for the node is set equal to zero, and the variable PTR.child.CUM for the node is set equal to zero (step 1516). Thereafter, the cumulative time for the node is incremented by incrementing the variable PTR.child.CUM (step 1518). The process also proceeds to step 1518 from step 1514 if the address has been seen at this level. In the case of sample-based trace records, the "cumulative" time represents the number of times that this particular call stack configuration has been processed.

Next, a determination is made as to whether the sample address, sample_address, is equal the last address in the call stack sample, call_stack_address[1] (step 1520). If the sample address is equal to the address being processed, the base time for the node is incremented by incrementing the variable PTR.child.BASE (step 1522). The pointer PTR is then set equal to the child (step 1524), and the index is decremented (step 1526) with the process then returning to step 1508 as previously described. With reference again to step 1520, if the sample address is not equal to the address being processed, the process then proceeds to step 1524.

In the depicted example in FIG. 15A, the process is used to process call stack unwind records recorded during execution of a program. The illustrated process also may be implemented to dynamically process call stack unwind records during execution of a program. For example, step 1510 may be modified to wait until the next timer interrupt occurs and then continue to loop back to step 1510 at the next interrupt.

The addresses obtained during sampling are used to identify functions. The functions are identified by mapping these addresses into functions.

Figure 15B:
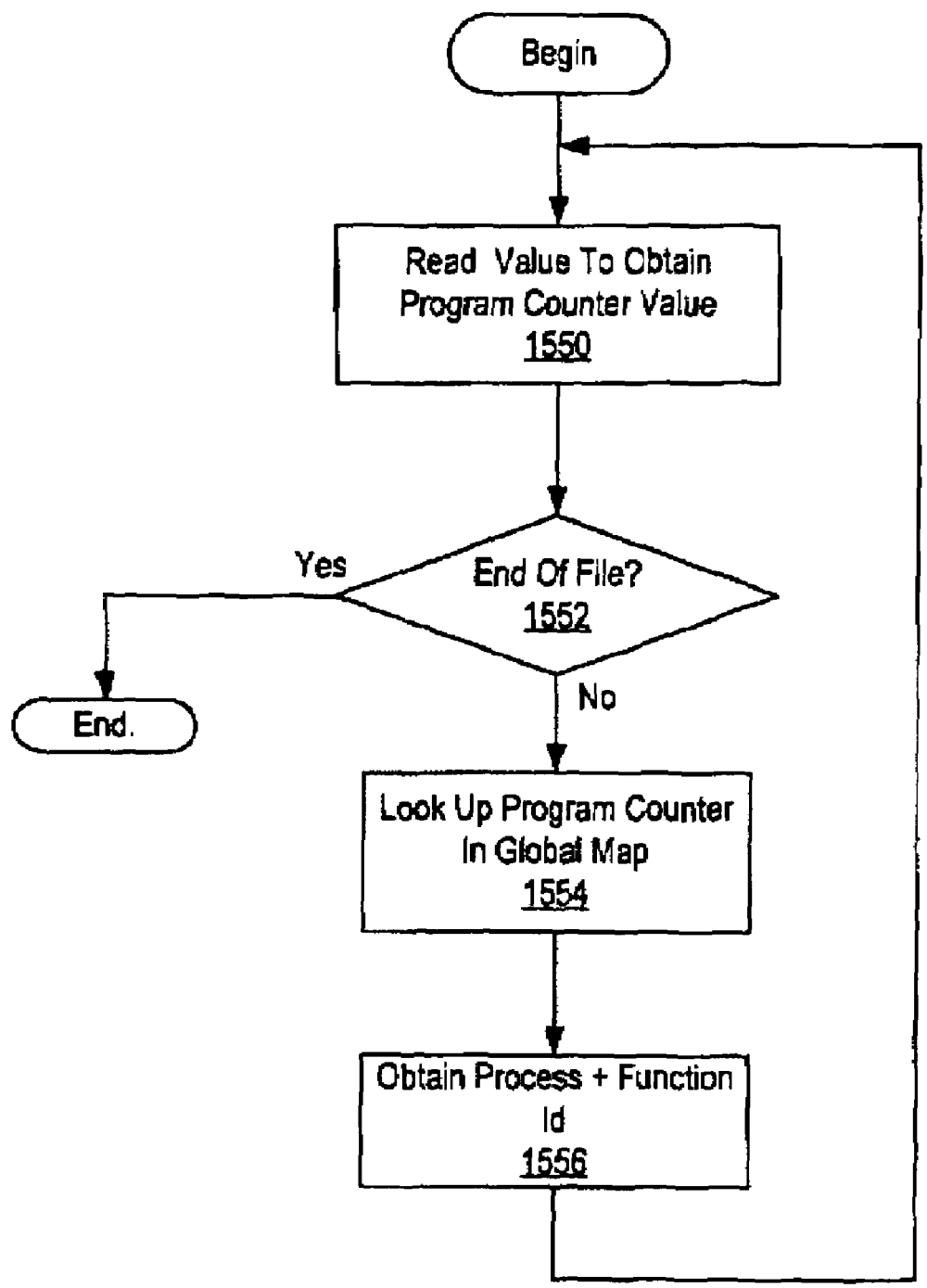
FIG. 15B is a flowchart depicting a process for identifying functions from an address obtained during sampling.

With reference now to FIG. 15B, a flowchart depicts a process for identifying functions from an address obtained during sampling. The process begins by reading a program counter value that is obtained during sampling of the call stack (step 1550). A determination is made as to whether the end of file has been reached (step 1552). If the end of the file has not been reached, the program counter value is looked up in a global map (step 1554). A global map in the depicted example is a map of system and per process symbols that are generated from system loader information and application, library, and system symbol tables. A process plus function id is obtained from the global map in response to looking up the program counter value (step 1556). Thereafter, the process returns to step 1550. The function information may be used in generating reports, such as those described below. The process in FIG. 15B also may be used during execution of a program that is sampled.

With reference now to FIG. 16, a diagram of a record generated using the processes of present invention is depicted. Each routine in record 1600 is listed separately, along with information regarding the routine in FIG. 16. For example, Calls column 1604 lists the number of times each routine has been called. BASE column 1606 contains the total time spent in the routine, while CUM column 1608 includes the cumulative time spent in the routine and all routines called by the routine. Name column 1612 contains the name of the routine. With reference now to FIG. 17, a diagram of another type of report that may be produced is depicted. The report depicted in FIG. 17 illustrates much of the same information found in FIG. 16, but in a slightly different format. As with FIG. 16, diagram 1700 includes information on calls, base time, and cumulative time.

FIG. 17 shows a sample-based trace output containing times spent within various routines as measured in microseconds. FIG. 17 contains one stanza (delimited by horizontal lines) for each routine that appears in the sample-based trace output. The stanza contains information about the routine itself on the line labeled "Self", about who called it on lines labeled "Parent", and about who the routine called on lines labeled "Child". The stanzas are in order of cum time. The third stanza is about routine A, as indicated by the line beginning with "Self." The numbers on the "Self" line of this stanza show that routine A was called three times in this trace, once by routine C and twice by routine B. In the profile terminology, routines C and B are (immediate) parents of routine A. Routine A is a child of routines C and B. All the numbers on the "Parent" rows of the second stanza are breakdowns of routine A's corresponding numbers. Three microseconds of the seven microsecond total base time spent in A was when it was called by routine C, and three microseconds when it was first called by routine B, and another one microsecond when it was called by routine B for a second time. Likewise, in this example, half of routine A's fourteen microsecond cum time was spent on behalf of each parent.

Looking now at the second stanza, we see that routine C called routine B and routine A once each. All the numbers on "Child" rows are subsets of numbers from the child's profile. For example, of the three calls to routine A in this trace, one was by routine C; of routine A's seven microsecond total base time, three microseconds were while it was called directly by routine C; of routine A's fourteen microsecond cum time, seven microseconds was on behalf of routine C. Notice that these same numbers are the first row of the third stanza, where routine C is listed as one of routine A's parents.

The four relationships that are true of each stanza are summarized at the top of FIG. 17. First, the sum of the numbers in the Calls column for parents equals the number of calls on the self row. Second, the sum of the numbers in the Base column for parents equals Self's base. Third, the sum of the numbers in the Cum column for parents equals Self's Cum. These first three invariants are true because these characteristics are the definition of Parent; collectively they are supposed to account for all of Self's activities. Fourth, the Cum in the Child rows accounts for all of Self's Cum except for its own Base.

Program sampling contains information from the call stack and provides a profile, reflecting the sampling of an entire call stack, not just the leaves. Furthermore, the sample-based profiling technique may also be applied to other types of stacks. For example, with Java programs, a large amount of time is spent in a routine called the "interpreter". If only the call stack was examined, the profile would not reveal much useful information. Since the interpreter also tracks information in its own stack, e.g., a Java stack (with its own linkage conventions), the process can be used to walk up the Java stack to obtain the calling sequence from the perspective of the interpreted Java program.

Figure 18:
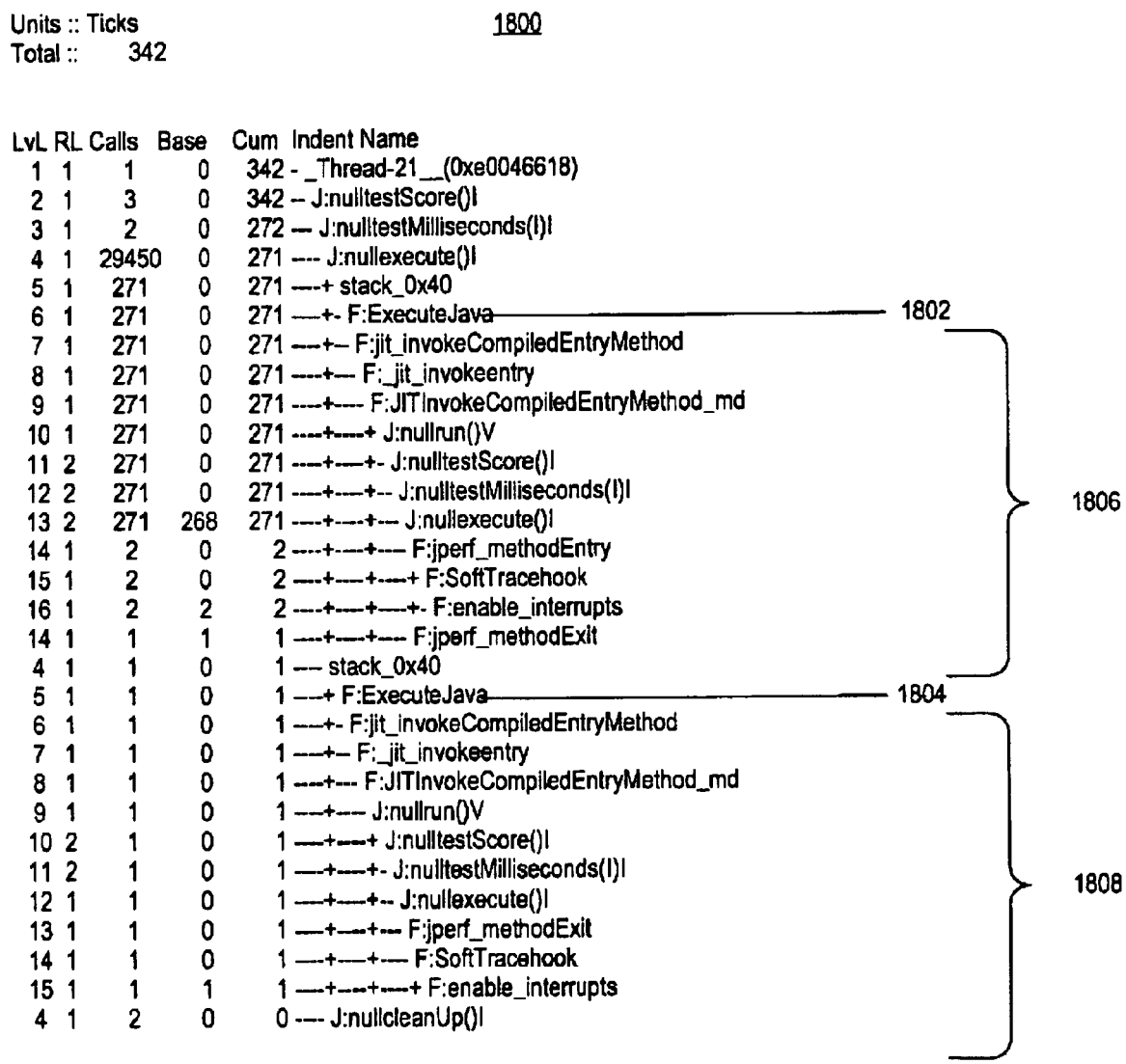
FIG. 18 is a table depicting a report generated from a trace file containing both event-based profiling information (method entry/exits) and sample-based profiling information (stack unwinds)

With reference now to FIG. 18, a figure depicts a report generated from a trace file containing both event-based profiling information (method entry/exits) and sample-based profiling information (stack unwinds). FIG. 18 is similar to FIG. 12, in which a call stack tree is presented as a report, except that FIG. 18 contains embedded stack walking information. Call stack tree 1800 contains two stack unwinds generated within the time period represented by the total of 342 ticks. Stack unwind identifier 1802 denotes the beginning of stack unwind information 1806, with the names of routines that are indented to the right containing the stack information that the stack walking process was able to discern. Stack unwind identifier 1804 denotes the beginning of stack unwind information 1808. In this example, "J:" identifies an interpreted Java method and "F:" identifies a native function, such as a native function within JavaOS. A call from a Java method to a native method is via "ExecuteJava." Hence, at the point at which the stack walking process reaches a stack frame for an "ExecuteJava," it cannot proceed any further up the stack as the stack frames are discontinued. The process for creating a tree containing both event-based nodes and sample-based nodes is described in more detail further below. In this case, identifiers 1802 and 1804 also denote the major code associated with the stack unwind.

With reference now to FIG. 19, a table depicts major codes and minor codes that may be employed to instrument software modules for profiling. In order to facilitate the merging of event-based profiling information and sample-based profiling information, a set of codes may be used to turn on and off various types of profiling functions.

For example, as shown in FIG. 19, the minor code for a stack unwind is designated as 0x7fffffff, which may be used for two different purposes. The first purpose, denoted with a major code of 0x40, is for a stack unwind during a timer interrupt. When this information is output into a trace file, the stack information that appears within the file will have been coded so that the stack information is analyzed as sample-based profiling information. The second purpose, denoted with a major code of 0x41, is for a stack unwind in an instrumented routine. This stack information could then be post-processed as event-based profiling information.

Other examples in the table show a profile or major code purpose of tracing jitted methods with a major code value of 0x50. Tracing of jitted methods may be distinguished based on the minor code that indicates method invocation or method exit. In contrast, a major code of 0x30 indicates a profiling purpose of instrumenting interpreted methods, while the minor code again indicates, with the same values, method invocation or method exit.

Referring back to FIG. 18, the connection can be made between the use of major and minor codes, the instrumentation of code, and the post-processing of profile information. In the generated report shown in FIG. 18, the stack unwind identifiers can be seen to be equal to 0x40, which, according to the table in FIG. 19, is a stack unwind generated in response to a timer interrupt. This type of stack unwind may have occurred in response to a regular interrupt that was created in order to generate a sampled profile of the executing software.

As noted in the last column of the table in FIG. 19, by using a utility that places a hook into a software module to be profiled, a stack unwind may be instrumented into a routine. If so, the output for this type of stack unwind will be designated with a major code of 0x41.

As discussed above, kernel threads are sometimes reused by the Jvm. When an operating system kernel reuses a kernel thread for a current Java thread, in cannot be known for certain whether the value of the kernel thread's metrics should be attributed to the current Java thread in its entirety. A portion of the change in the value of an accumulated metric for the reused kernel thread may be attributable to a previous Java thread. Therefore, when a profiler calls for the change in a value of an accumulated kernel thread metric variable, the value returned to the profiler might be too high because metrics for the kernel thread were accumulated for other Java threads. Profiling information for a Java thread, which gets its metric variable values from a reused kernel thread, is unreliable unless a means for apportioning the value of the change in a metric for a reused kernel thread ID between Java threads.

Figure 20:
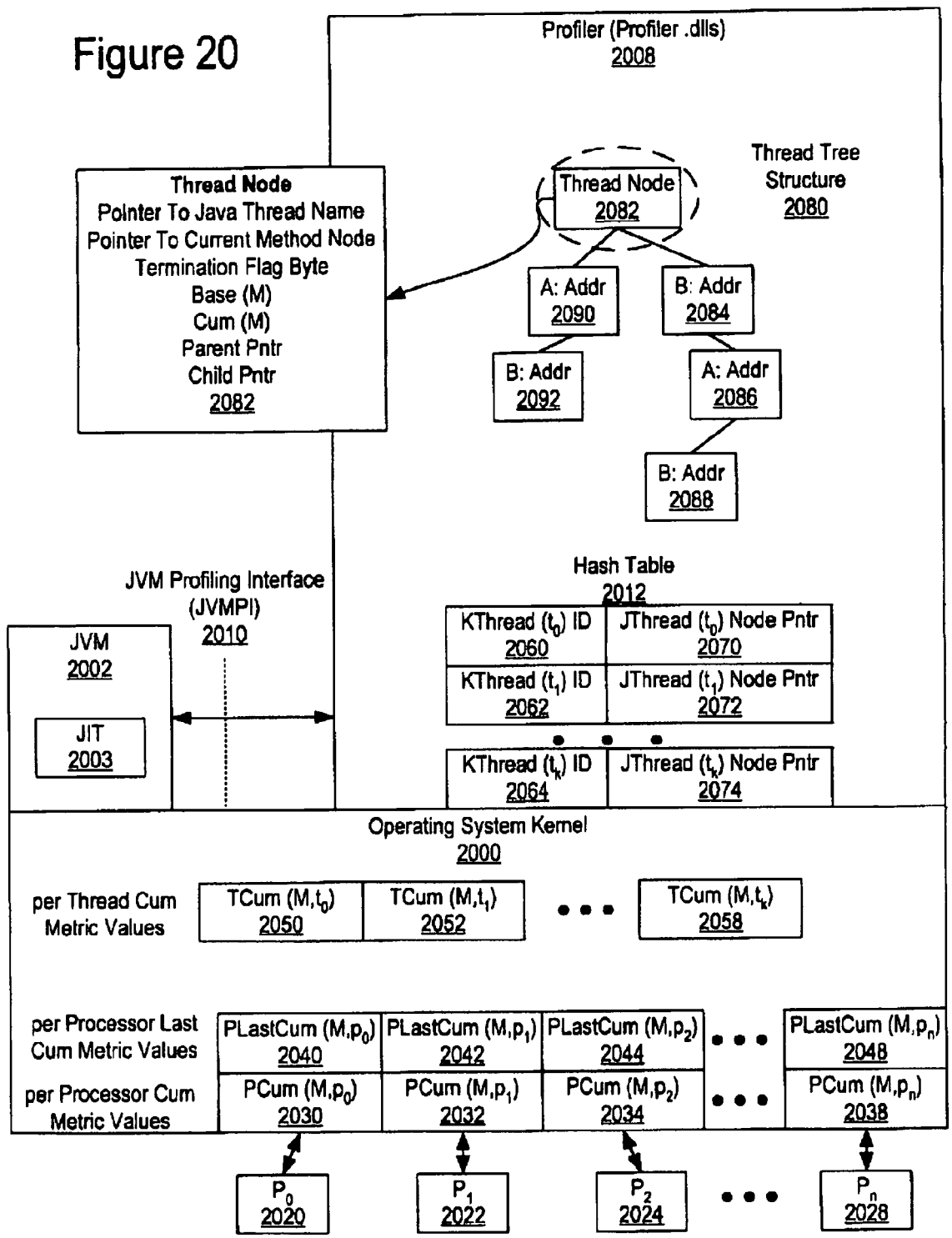
FIG. 20 is a blocked diagram that depicts a relationship to a profiler and other software components in a data processing system capable of accurately tracking metrics when operating system kernel threads are reused by the Jvm, in accordance with a preferred embodiment of the present invention.

With reference now to FIG. 20, a blocked diagram that depicts a relationship to a profiler and other software components in a data processing system capable of accurately tracking metrics when operating system kernel threads are reused by the Jvm, in accordance with a preferred embodiment of the present invention. Operating system kernel 2000 provides native support for the execution of programs and applications, such as Jvm 2002 in the data processing system. Jvm 2002 executes Java programs, possibly compiling the program via a just-in-time (JIT) compiler 2003. As Java applications execute, objects are allocated in a heap and the Jvm maintains heap information concerning the objects, such as, heap 1960 shown in FIG. 19. Profiler 2008 accepts events from Jvm 2002 instrumentation through Jvm profiling interface (JVMPI) 2010, and returns the information as required by the Jvm. Preferably, the profiler 2008 is a set of native runtime DLLs (dynamic link libraries) supported by operating system kernel 2000. Profiler 2008 generates thread tree structure 2080, trace output (not shown), et cetera, as necessary to run a runtime profile to an application developer monitoring the execution of a profiled program.

In accordance with a preferred embodiment of the present invention, profiler 2008 allocates memory space in its own buffer for hash table 2012, which contains a slot for each active kernel thread's identity, KThread ($t_0$) ID 2060 to KThread ($t_k$) ID 2064. Additionally, hash table 2012 contains a Java thread node pointer to Java thread nodes contained in tree structure 2080, these are depicted as JThread ($t_0$) node Pntr 2070 through JThread ($t_k$) node Pntr 2074 in the figure. Each Java thread node pointer is associated with an active kernel thread listed in hash table 2012.

Profiler 2008 also allocates memory space for tree structure. A tree structure may contain a plurality of thread tree structures such as thread tree structure 2080. In the depicted example, tree structure 2080 consists of a top node, thread node 2082 and five method nodes, nodes 2084-2092. In each node in tree structure 2080, a number of statistics or metric variable values are recorded. In the depicted example, each node, nodes 2082-2090, contain at least a base metric variable (Base (M)), cumulative metric variable (Cum (M)) and parent and children pointers. All thread nodes, such as thread node 2082 contain additional information including a pointer to the Java thread name for the thread node, a pointer to the current method node that is being processed and a thread termination flag. The Java thread name pointer is a convenient means for providing to the Java thread name without increasing the node's size to accommodate the actual Java thread name. Alternatively, the Java thread name or pointer to the Java thread name may be stored in hash table 2012. The pointer to the current method node always points to the node of the current method. Finally, thread node 2082 also contains an entry position for a termination flag byte. The termination flag is provided to indicate which Java thread are no longer used, thus method nodes in the thread node's tree structure will node be updated.

Method nodes, such as method nodes 2084-2092, also contain an address that represents a function entry point for that method, of course the thread node, depicted in the figure as node 2082, will not have such an address. As discussed above with respect to FIG. 11, the metric information may be obtained from event-based trace records. The base metric variable in the node represents the amount of each tracked metric consumed directly by the thread executing this function. The cumulative metric variable is the amount of each metric consumed by the thread executing this function and all functions below it on the call stack. In the depicted example, node pointers are included for each node. One pointer is a parent pointer, a pointer to the node's parent. Each node also contains a pointer to each child of the node. Those of ordinary skill in the art will appreciate that tree structure 2080 may be implemented in a variety of ways and that many different types of statistics may be maintained at the nodes other than those in the depicted example.

Jvm 2002 utilizes operating system kernel 2000 for processing support. Operating system kernel 2000 controls one or more processors for processing threads for Jvm 2002. In accordance with a preferred embodiment of the present invention, profiler 2008 accurately tracks metric values regardless of whether or not a kernel thread has been reused. Accurately tracking per thread metric variables with reused kernel threads where the application calculates the thread level change in the value since the last request for a thread level metric is disclosed in "METHOD AND SYSTEM FOR TRACING PROFILING INFORMATION IN AN APPLICATION USING PER THREAD METRIC VARIABLES WITH REUSED KERNEL THREADS" U.S. application Ser. No. 09/612,349, filed Jul. 6, 2000, which is incorporated by reference in its entirety.

Profiler 2008 accurately tracks metric values regardless of whether operating system kernel 2000 supports a uniprocessor system or a symmetric multiprocessing (SMP). Apportioning changes in the value of metric variables for profiling information is disclosed in "METHOD AND SYSTEM FOR APPORTIONING CHANGES IN METRIC VARIABLES IN AN SYMMETRIC MULTIPROCESSOR (SMP) ENVIRONMENT", U.S. application Ser. No. 09/612,340, filed Jul. 6, 2000, which is incorporated by reference in its entirety.

In the depicted example, operating system kernel 2000 supports an SMP system which allows multiple processors to operate simultaneously, thus processors $P_0$ 2020-$P_n$ 2028 are supported by operating system kernel 2000 in a multiprocessing fashion.

Operating system kernel 2000 allocates areas for per processor metric variables from each processor. These metric variables include a processor accumulated metric variable for each processor (p), PCum (M,p), and a processor last accumulated metric variable for each processor (p), PLastCum (M,p). These metric variables are depicted in the present diagram as PCum (M,$p_0$) 2030 to PCum (M,$p_n$) 2038 and PLastCum (M,$p_0$) 2040 to PLastCum (M,$p_n$) 2048.

Here, the notation 'M' represents values for individual metrics $m_1$, $m_2$, $m_3$ . . . $m_j$. It should be understood that reference to metrics (M) refers to any one or all of individual metrics $m_1$, $m_2$, $m_3$ . . . $m_j$, where M=$m_1$, $m_2$, $m_3$ . . . $m_j$. An individual metric (m) is any metric normally tracked for monitoring method execution, performance optimization or memory leak detection, such as number of allocated objects or bytes to a method or execution time.

The value of a per processor change in a metric variable, Delta (M), can be calculated from the per processor metric variables, for processor (p), and used to update the value of an accumulated metric variable for thread (t) running on the processor, TCum (M,t). Therefore, operating system kernel 2000 must also allocate an area for storing the value of accumulated metric variable for each active thread (t), TCum (M,t). Thread level metric variables are depicted in the present diagram as TCum (M,$t_0$) 2050 to TCum (M,$t_k$) 2058.

In accordance with a preferred embodiment of the present invention, profiler 2008 accurately updates base metric variables from thread level metric values obtained from reused kernel threads, regardless of the type of processor architecture. Operating system kernel 2000 may utilize a single processor (uniprocessor architecture) or may instead utilize multiple processors in a symmetrical multiprocessor (SMP) architecture as depicted in the present figure by processors $P_0$ 2020 to $P_n$ 2028. Operating system kernel 2000 calculates the change in the value of per processor metric variable for a processor, Delta (M), and then uses Delta (M) to update the value of the accumulated metric variable for the thread (t), TCum (M,t), which is running on that processor. The accumulated metric variables for each kernel thread are then available to profiler 2008. Each time profiler 2008 retrieves a value of the accumulated metric variable for a thread (t), TCum (M,t), the value held by operating system kernel 2000 is reset to zero. Therefore, each value of the accumulated metric variable for a thread (t), TCum (M,t), is effectively the value of the change in the accumulated metric variable for any thread (t), Delta (M), since the last request from the profiler.

Profiler 2008 accepts a Java thread event from JVM 2002, and based on the type of thread event, profiler 2008 may create a new node on tree structure 2080, for example, if the thread event is a method entry or exit. The profiler will only create a new node if a node does not already exist for the current Java thread on tree structure 2080. If a new node is created, hash table 2012 is checked for the existence of the kernel thread ID. If the kernel thread ID is not in hash table 2012, then the kernel thread ID has not been reused so that the kernel thread ID and node pointer to the current Java thread's node on tree structure 2080 are entered in hash table 2012. TCum (M,t) from the current kernel thread (t), which is discussed above, is the equivalent of Delta (M), is then applied to the current node in tree structure 2080.

If the kernel thread ID has been reused, then the kernel thread ID exists in hash table 2012. Therefore the change in the value of the accumulated metric variable for a thread (t), TCum (M,t), is applied to the previous Java thread's node using a node pointer for the previous Java thread's node from hash table 2012 rather than being applied to the current node. Alternatively, TCum (M,t) may instead be applied to the new Java thread's node in tree structure 2080. A termination flag is then placed in the previous Java thread's node indicating the node is no longer used. In addition, the previous Java thread's node pointer in hash table 2080 is overwritten by the current Java thread's node pointer. If, on the other hand, a node exists for the current Java thread, then a new node is not created. In that case the change in the value of the accumulated metric variable for a thread (t), TCum (M,t), is applied to the current node in tree structure 2080.

Figure 21A:
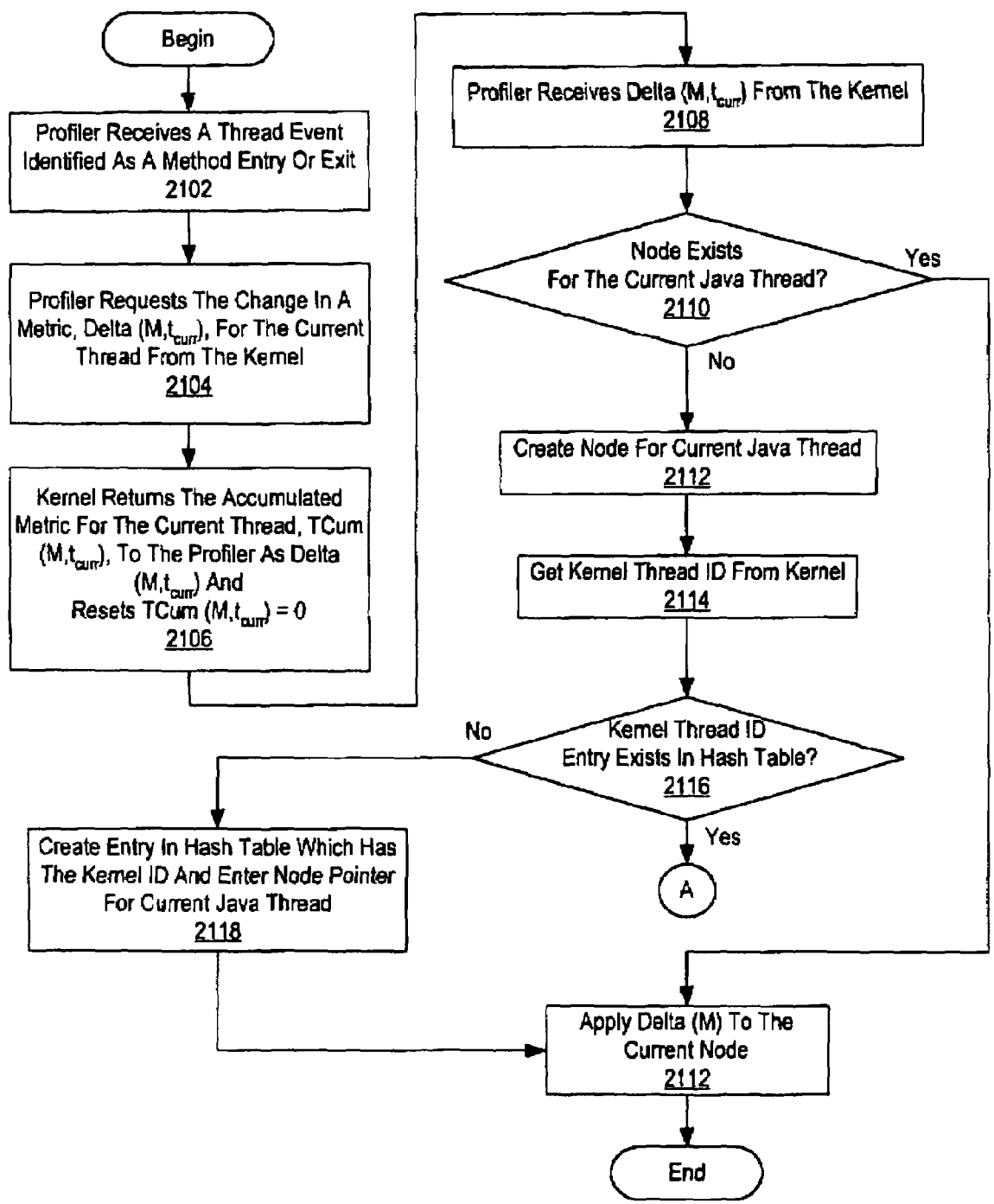
FIGS. 21A and 21B are flowcharts that depict a process for accurately tracking the value of metrics in response to a method entry or exit event where kernel threads may be reused in accordance with a preferred embodiment of the present invention.
Figure 21B:
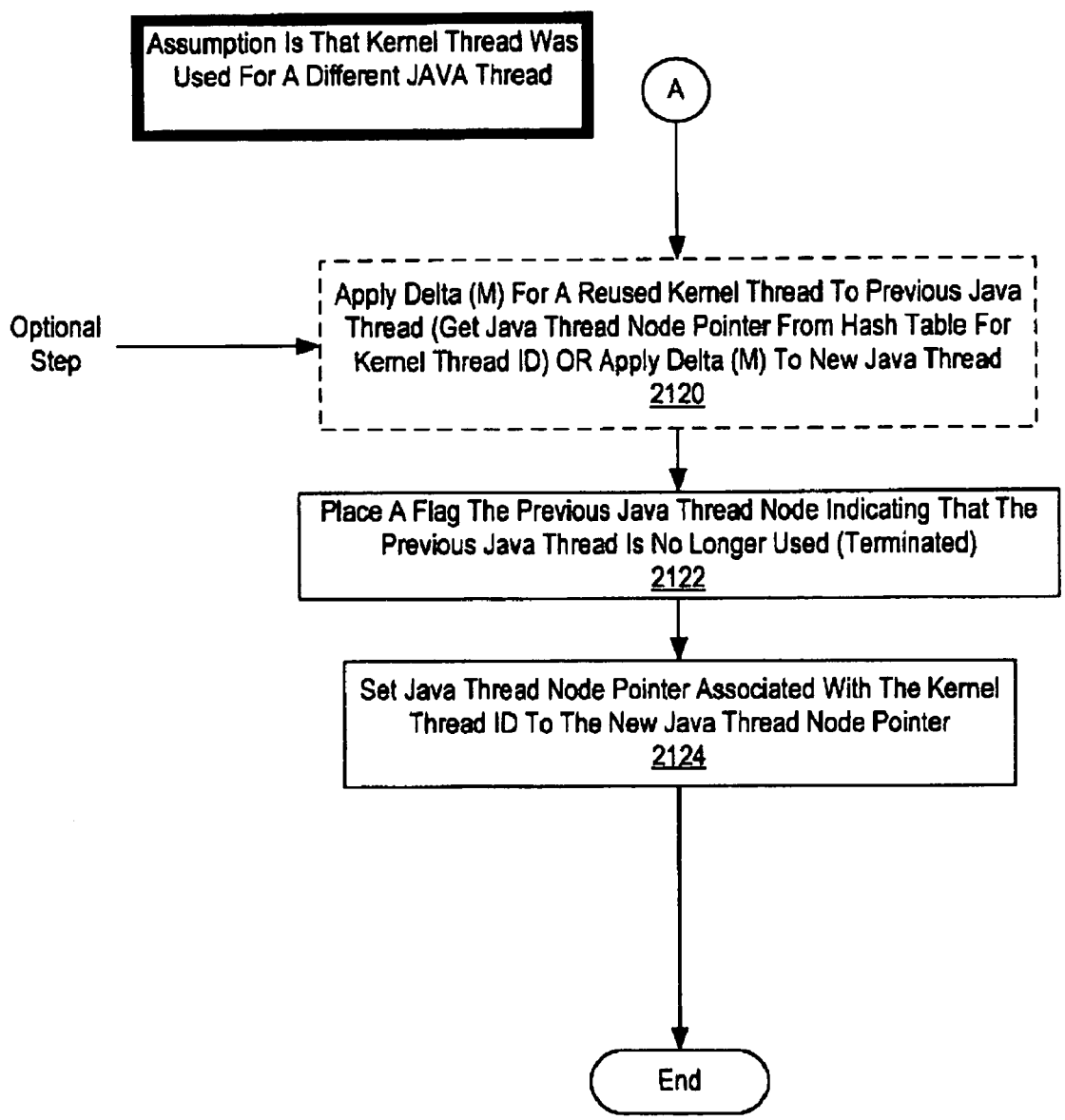

FIGS. 21 and 22 are flowcharts depicting in detail the processes for updating metric variables store in tree structure 2080. With reference to FIGS. 21A and 21B, a flowchart depicting a process for accurately tracking the value of metrics in response to a method entry or exit event where kernel threads may be reused in accordance with a preferred embodiment of the present invention. The process begins with the profiler receiving a thread event identified as either a method entry or exit (step 2102). The profiler then requests the value of the change in a metric for the current thread, Delta (M,$t_{curr}$) from the operating system kernel (step 2104). In response to the request, the operating system kernel calculates the current value of the accumulated metric variable for the current thread (t), TCum (M,$t_{curr}$), (as will be described below with respect to FIG. 24), and returns the value to the profiler for the requested value of Delta (M,$t_{curr}$). The operating system kernel then resets Tcum (M,$t_{curr}$) to zero (step 2106).

$$\text{Delta}(M, t_{curr}) = T\text{cum}(M, t_{curr}), \text{ then}$$

$$T\text{cum}(M, t_{curr}) = 0$$

Next, the profiler receives the value of the change in the metric variable, Delta (M,$t_{curr}$) from the operating system kernel (step 2108). The profiler then checks for the existence of a node for the current Java thread (step 2110). If a node exists for the current Java thread, the profiler then applies Delta (M) to the base metric variable, Base (M), held in the old Java thread's node in the tree structure (step 2112). The value of the metric variable Base (M), contained in the old thread node, is updated by the value of the change in the metric variable, Delta (M) by:

$$\text{Base}(M) += \text{Delta}(M)$$

The sub-process for accurately tracking the value of metrics in for an old Java thread is then complete.

Returning to step 2110, if a node does not exist for the current Java, the profiler creates a node for the current Java thread (step 2112). The profiler then gets the kernel thread ID from the operating system kernel (step 2114) and checks the hash table for the existence of an entry for the current kernel thread ID (step 2116). If the current kernel thread ID does not exist in the hash table, then the profiler creates an entry table for the current kernel thread ID and places a copy of a node pointer to the current Java thread's node in the hash table (step 2118). The profiler then applies the value of the change in the metric, Delta (M) to the base metric, base (M), in the new thread node (step 2112). The value of the metric variable Base (M) is updated by the value of the change in the metric variable, Delta (M) by:

$$\text{Base}(M) += \text{Delta}(M)$$

Of course, since the node has newly created the value of the base metric variable, Base (M) is zero. The sub-process for accurately tracking the value of metrics in response to creating a node for a new Java thread, wherein a kernel thread is not reused, is then complete.

Returning to step 2116, if a new node has been created for the current Java thread and the kernel thread ID has previously been entered in the hash table, then the kernel thread ID is being reused. It is assumed that if an entry exists for the kernel thread ID in the hash table, then that kernel thread identity was used for a different Java thread. On that assumption, the value of the change in the metric, Delta (M), may be applied to the previous Java thread's node for the reused kernel thread (step 2120). The profiler gets a Java thread's node pointer associated with the kernel ID from the hash table in order to find the correct node to apply to the Delta (M). The value of the metric variable Base (M) stored in the previous Java thread node is then updated by the value of the change in the metric variable, Delta (M) by:

$$\text{Base}(M) += \text{Delta}(M)$$

Alternatively, the Delta (M) may be applied to the new Java thread instead of the old Java thread. The profiler knows where the current node in the tree structure is located, so the hash table is not accessed for the node pointer. The value of the metric variable Base (M) stored in the new Java thread's node is then updated by using the value of the change in the metric variable, Delta (M). The metric variable Base (M) is update by:

$$Base(M) += Delta(M)$$

The profiler then flags the Java thread node to indicate that the node is no longer being used (step 2122). The profiler then sets the Java thread node pointer at the kernel thread ID in the hash table to the new Java thread node pointer by overwriting the old Java thread node pointer with the new Java thread node pointer (step 2124). The sub-process for accurately tracking the value of metrics in response to creating a node for a new Java thread, wherein a kernel thread is being reused, is then complete.

In reference to FIG. 22, a flowchart depicting a Java thread process for handling a thread termination notification in accordance with a preferred embodiment of the present invention. The process begins with the profiler receiving a thread event which is identified as a thread termination event (step 2202). The profiler then requests the value of the change in the metric variable for the current thread, Delta (M,$t_{curr}$) from the operating system kernel (step 2204). The operating system kernel calculates the value of the accumulated metric variable for the current thread, Tcum (M,$t_{curr}$), and then returns it to the profiler for the value of Delta (M,$t_{curr}$). The profiler then resets Tcum (M,$t_{curr}$) to zero (step 2206).

$$Delta(M, t_{curr}) = Tcum(M, t_{curr}), \text{ then}$$

$$Tcum(M, t_{curr}) = 0$$

The profiler receives the value of the change in the metric value, Delta (M,$t_{curr}$), from the operating system kernel (step 2208). The profiler needs the kernel thread ID in order to look up current Java thread's node pointer from the hash table. So, the profiler gets the kernel thread ID from the operating system kernel (step 2210). Having the kernel thread ID, the profiler accesses the Java thread node pointer in the hash table (step 2212). Thereafter, the profiler checks the Java thread node for a flag designating the Java thread as being terminated (step 2214). If the Java thread node is marked as being terminated, the profiler applies the value of the change in the metric variable, Delta (M), to the value of the base variable, Base (M), for the last method of the termination Java thread using the pointer in the thread node. Alternatively, the value of the change in the metric variable, Delta (M), may be applied to the value of the base variable, Base (M), for the new Java thread (step 2216). Of course, a new node must first be created for the new Java thread prior to updating its metrics. The profiler knows which node the current Java thread's metrics are contained in without accessing the hash table of the current Java thread's node pointer. The value of the metric variable Base (M), stored in either last method of the terminated Java thread's node or the new Java thread node, and is updated by the value of the change in the metric variable, Delta (M) by:

$$Base(M) += Delta(M)$$

The sub-process for a process for handling a thread termination notification, wherein a Java thread is being terminated has been flagged, is then complete.

Returning to step 2214, if the Java thread node has not been flagged as being terminated, then the current Java thread's node can be updated with Delta (M). In that case, the profiler applies the change in the value of the metric variable, Delta (M), to the current Java thread's node (step 2218) and flags that Java thread node as being terminated (step 2220). The Java thread is flagged by changing the termination byte held in the Java thread's node. The sub-process for a process for handling a thread termination notification, wherein a Java thread is being terminated has not been flagged, is then complete.

Figure 23:
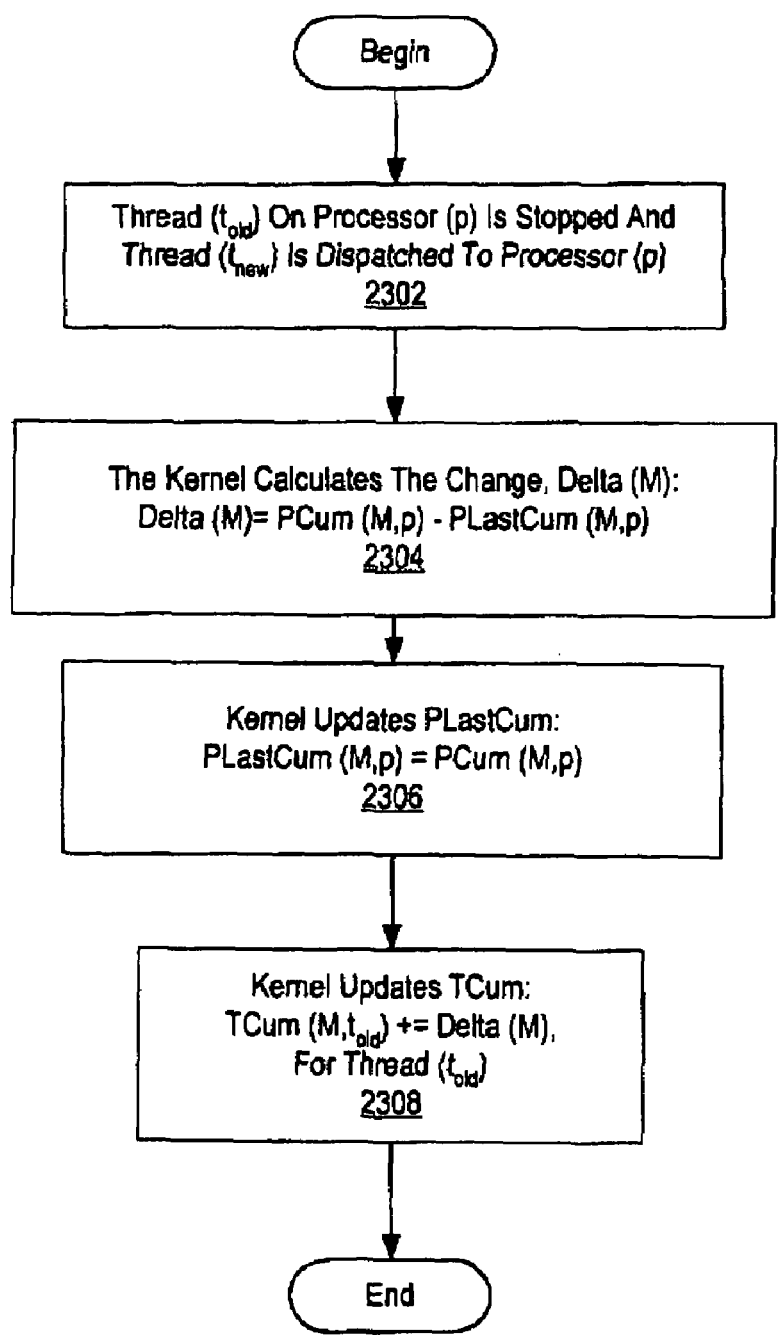
FIG. 23 is a flowchart depicting a process for the operating system kernel updating a base metric variable value in response to a thread dispatch event in accordance with a preferred embodiment of the present invention.

With reference to FIG. 23, a flowchart depicting a process for the operating system kernel updating a base metric variable value in response to a thread dispatch event in accordance with a preferred embodiment of the present invention. Each time a new thread is dispatched, the value of the per processor metric variable for the old thread running on processor (p), TCum (M,p) and maintained in processor (p)'s data area, must be used to update the value of the thread accumulated metric variable for thread ($t_{old}$), TCum (M,$t_{old}$), held in the operating system kernel's data area. Thereafter, the value of the last accumulated metric variable for processor (p), PLastCum (M,p), which will be used to start new thread ($t_{new}$), is replaced by the current value of the accumulated metric variable, PCum (M,p), being held in processor (p)'s data area. Processor (p) can then proceed in processing new thread ($t_{new}$) while accurately tracking metrics for the new thread ($t_{new}$).

The process begins when processor (p) determines that a thread switch is necessary. Thread ($t_{old}$) on processor (p) is stopped and thread ($t_{new}$) is dispatched to processor (p) (step 2302). The operating system kernel then calculates the value of the change in metric (M), Delta (M) (step 2304). The value of the change in metric, Delta (M), is found by decreasing the value of the accumulated metric variable for processor (p), PCum (M,p), by the value of the last accumulated metric variable for processor (p), PLastCum (M,p). The metric variable Delta (M) is calculated by:

$$Delta(M) = PCum(M,p) - PLastCum(M,p)$$

Next, the operating system kernel sets the value of the last accumulated metric variable for processor (p), PLastCum (M,p) to the current value of the last accumulated metric variable for processor (p), PLastCum (M,p) (step 2306). The metric variable PLastCum (M,p) is set by:

$$PLastCum(M,p) = PCum(M,p)$$

Finally, the operating system kernel uses Delta (M) to update the value of the accumulated metric variable for thread ($t_{old}$), TCum (M,$t_{old}$) (step 2308). The current value of TCum (M,$t_{old}$) held in the operating system kernel's data area must be increased to accurately reflect the change in the value of the metric, Delta (M). The metric variable TCum (M,$t_{old}$) is updated by:

$$TCum(M, t_{old}) += Delta(M)$$

The process is now complete for updating a metric in response to a thread being dispatched to processor (p).

Figure 24:
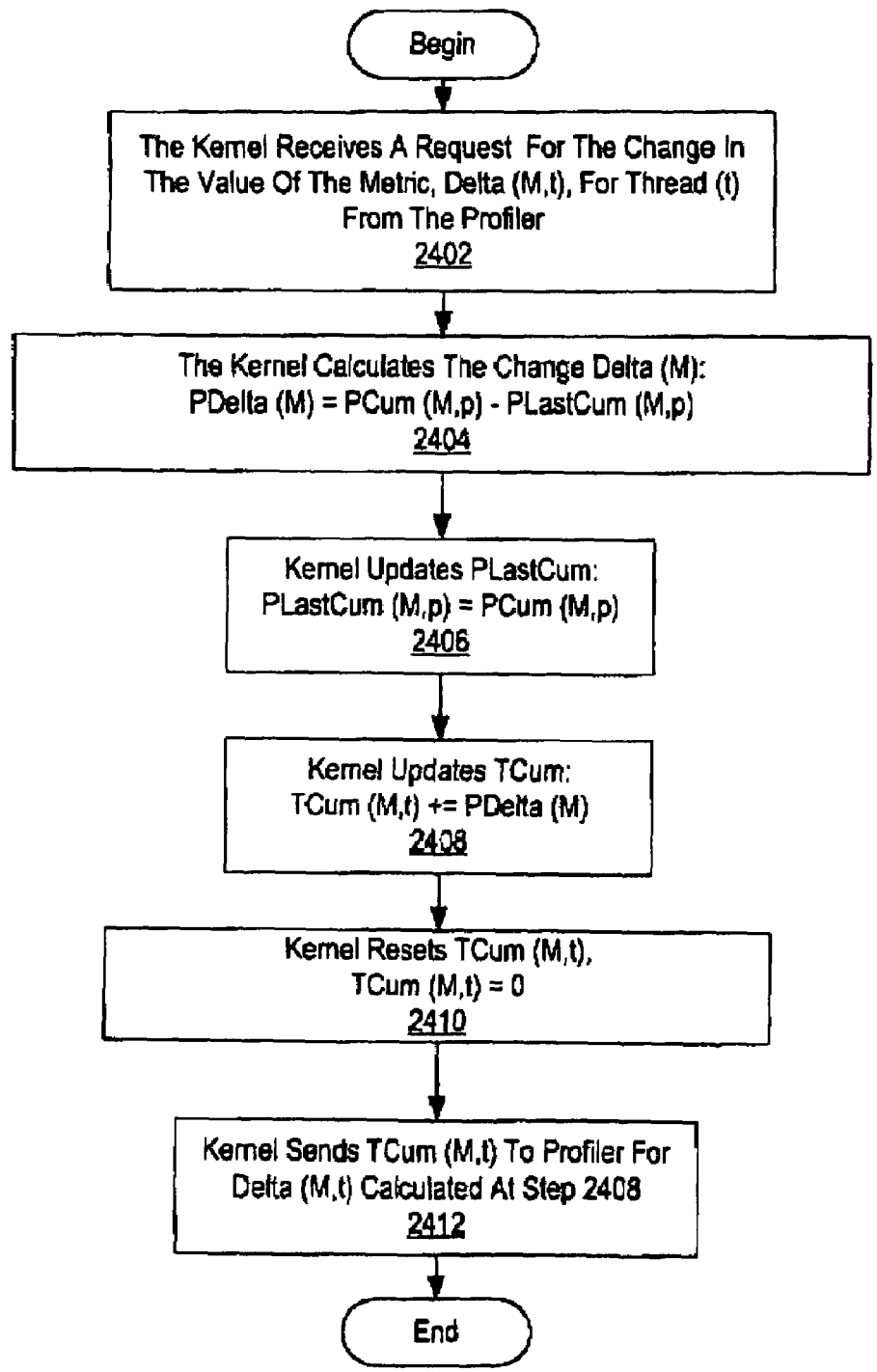
FIG. 24 is a flowchart depicting the process for updating base metric variable values in response to a method entry or exit event in accordance with a preferred embodiment of the present invention.

With respect to FIG. 24, a flowchart depicting the process for updating base metric variable values in response to a method entry or exit event in accordance with a preferred embodiment of the present invention. The process begins with the operating system kernel receiving a request from the profiler for the value of the change in a metric variable for thread (t), Delta (M,t), (step 2402). The operating system kernel calculates the value of the change in metric (M), Delta (M), from processor (p), which is currently running thread (t) (step 2404). The value of the change in metric (M), Delta (M), is the difference between the present per processor value of the accumulated metric variable for processor (p), processing thread (t), PCum (M,p), and the per processor value of the last accumulated metric variable for that processor, PLastCum (M,p). The metric variable Delta (M) is calculated by:

$$PDelta(M) = PCum(M,p) - PLastCum(M,p)$$

Having used the value of PLastCum (M,p) for calculating Delta (M), the kernel sets PLastCum (M,p), to the current value of the accumulated metric variable on processor (p), PCum (M,p) (step 2406). The metric variable PLastCum (M,p) is set by:

$$PLastCum(M,p)=PCum(M,p)$$

The operating system kernel then updates the value of the accumulated metric variable for thread (t), TCum (M,t) (step 2408). The metric variable TCum (M,t), to be returned to the profiler, is held in the operating system kernel's data area and must be increased by the value of the change in the metric variable on processor (p), PDelta (M), in order to reflect the change in the value of metric (M) attributed to processor (p). The metric variable TCum (M,t), to be returned to the profiler, is updated by:

$$TCum(M,t) += PDelta(M)$$

Next, the value of the accumulated metric variable for thread (t), TCum (M,t), to held by the operating system kernel, is set to zero (step 2410). The metric variable TCum (M,t), to be held by the operating system kernel, is set by:

$$TCum(M,t)=0$$

The operating system kernel then sends the value of the accumulated metric variable for the current thread, TCum (M,t), to the profiler for the request value of the change in the metric variable for the current thread, Delta (M,t) (step 2412). The process for the profiler updating a base metric variable in response to method entry or exit event is now complete.

With reference now to FIG. 25, a blocked diagram that depicts a relationship to a profiler and other software components in a data processing system, which reuses operating system kernel threads for accurately tracking the value of metric variables in accordance with a preferred embodiment of the present invention. The system depicted in FIG. 25 is similar to that depicted in FIG. 20 therefore, only the differences will be discussed in detail. The primary difference in the embodiments depicted on the two diagrams is as follows: The present diagram shows the value of the accumulated metric variables for each thread (t), TCum (M,t), being held by the operating system kernel in a linked list data structure. However, one of ordinary skill in the art would recognize that other data structures may be used for storing the value of the accumulated metric variables for each thread, such as a hash table. A record is entered in the linked list 2550 only when the value of the accumulated metric for that thread is greater than zero. In the linked list 2550, values for accumulated metric variables for threads ($t_0$-$t_k$) are depicted as TCum (M,$t_0$) 2552 to TCum (M,$t_k$) 2558. Because an accurate value for a current thread must be calculated when a request is received from the profiler, operating system kernel 2500 also provides a data area for the value of the accumulated metric variable for the current thread ($t_{curr}$), TCum (M,$t_{curr}$) 2526, and the value of the last accumulated metric variable for the current thread ($t_{curr}$), TLastCum (M,$t_{curr}$) 2528.

This approach for operating system kernel 2500 keeping track of non-zero metric accumulations has the advantage of treating all metric, whether time, counters or other metrics, in a unified manner. Therefore, no special catching up to non-Java threads is required at the end of a run. For many Java applications the only non-zero value of an accumulated metric variable for a thread is for the current kernel/Java thread running, TCum (M, $t_{curr}$). As non-Java tasks are run, operating system kernel 2500 enters the change in the value of the accumulated metric variables to each thread (t) in linked list 2500, along with the kernel thread ID. When operating system kernel 2500 receives a request from profiler 2508 for the value of the change in metric variables, Delta (M), operating system kernel 2500 reads each and zeros each thread's entry, in addition to calculating a value for the current thread. All values for Delta (M) greater than zero are then sent to profiler 2508. Additionally, requests for non-zero thread metrics may be handled by a separate interface from requests for thread metric for a single thread, via a separate call. Thus, the collection of non-zero changes in the value of metric variables could be accomplished either periodically or at the end of a run. Linked list 2550 facilitates intermediate full tree snapshots of profiling information for an application.

The present embodiment utilizing the linked list for storing non-zero per thread metric variables may be incorporated in each of the processes described above with respect to FIGS. 21-24.

With reference to FIG. 26, a flowchart depicting a process for updating the value of a base metric variable when the operating system kernel stores the change in the non-zero value of metric variables in a linked list in accordance with a preferred embodiment of the present invention. The process begins with the operating system kernel receiving a request from a profiler for the value of the change in the metric variable, Delta (M), for all threads where the value of the accumulated metric variable, TCum (M,t), for each entry in the link list that is greater than zero TCum (M,t)>0 (2602). The request may be made at the end of a run. The kernel finds entries in the link list for each thread ID which has been previously run, and threads ($t_0$-$t_k$) (step 2604). The value of the accumulated metric variables in these entries are Delta (M) because the entries in the linked list are zeroed at each reading.

The kernel then calculates the change in the value of the metric variable, Delta (M), for the current thread, DeltaCum (M,$t_{curr}$), by reducing the value of the accumulated metric variable for the current thread, TCum (M,$t_{curr}$), by the value of the last accumulated metric variable for the current thread, TLastCum (M,$t_{curr}$) (step 2606). The value of the metric variable DeltaCum (M,$t_{curr}$) is calculated by:

$$DeltaCum(M,t_{curr})=TCum(M,t_{curr})-TLastCum(M,t_{curr})$$

The operating system kernel then resets the value of the last accumulated metric variable for the current thread, TLastCum (M,$t_{curr}$), to zero (step 2608). The metric variable TLastCum (M,$t_{curr}$) is reset by:

$$TLastCum(M,t_{curr})=0$$

After the change in the value of the accumulated metric variable for the current thread, TCum (M,$t_{curr}$), has been calculated, the operating system kernel reads the values for the change in the accumulated metric variables, Delta (M), for all threads other than the current thread stored in the linked list (step 2610). The change in the accumulated metric variables for all previously run threads ($t_0$-$t_k$), Delta (M), are saved in the linked list as the accumulated metric variables, TCum (M,$t_0$) to TCum (M,$t_k$). The operating system kernel then sends the values of the change in the accumulated metric variables for threads ($t_0$-$t_k$ and $t_{curr}$), Delta (M,$t_0$-$t_k$ and ($t_{curr}$) (step 2612). After the entries in the linked list have been read, the operating system kernel resets the values of the accumulated metric variables for threads ($t_0$-$t_k$), TCum (M,$t_0$-$t_k$), to zero. The metrics variables are reset by:

$$TCum(M,t_0\text{-}t_k)=0, \text{ for each entry}$$

The process for updating metric values where the operating system kernel stores the change in the non-zero value of metric variables in a linked list is now complete.

Although the present invention has been described above in terms of the Java runtime environment, one of ordinary skill in the art would readily realize that that the present invention could be implemented in other languages without departing for the scope of the invention. The language must make the profiler aware of the language thread name or ID. Languages that use the PThread library may have thread reuse. An instrumented PThread library provides the required language thread naming support.

Note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media, such as digital and analog communications links.

It is important to note that while the present invention has been described in the context of a single active Jvm within an operating system, there are no constraints to its application to multiple Jvms. This generalization is well within the means of those with ordinary skill in the art.

The description of the present invention has been presented for purposes of illustration and description, but is not limited to be exhaustive or limited to the invention in the form disclosed. Many modifications and variations will be apparent to those of ordinary skill in the art. For example, the present invention may be applied to other interpreted programming systems and environments other than Java. The embodiment was chosen and described in order to best explain the principles of the invention the practical application and to enable others of ordinary skill in the art to understand the invention for various embodiments with various modifications as are suited to the particular use contemplated.

What is claimed is:

1. A method for monitoring performance of a program being executed using per thread metric variables with reused kernel threads comprising:
   receiving an event indication;
   ascertaining kernel thread level profile information;
   identifying a kernel thread, wherein the kernel thread level profile information is attributed to the identified kernel thread;
   determining whether the identified kernel thread has been reused; and
   updating profile information with the kernel thread level profile information based whether the identified kernel thread has been reused.

2. The method recited in claim 1 above, wherein determining whether the identified kernel thread has been reused further comprises:
   checking a hash table for an entry of the identified kernel thread.

3. The method recited in claim 1 above, wherein updating profile information with the kernel thread level profile information based on the identified kernel thread is reused further comprises:
   applying the kernel thread level profile information for the reused identified kernel thread to one of a previous application thread and a new application thread.

4. The method recited in claim 2 above, wherein updating profile information with the kernel thread level profile information based on the identified kernel thread is reused further comprises:
   applying the kernel thread level profile information for the reused identified kernel thread to one of a previous application thread and a new application thread;
   marking the previous application thread being terminated; and
   associating the reused identified kernel thread with the new application thread in the hash table.

5. The method recited in claim 1 above, wherein the profile information is stored in a node for a application thread which is associated with the kernel thread level profile information.

6. The method recited in claim 1 above, wherein ascertaining kernel thread level profile information further comprises:
   sending a request for kernel thread level profile information to an operating system kernel, wherein the operating system kernel responds to the request by:
   receiving the request for kernel thread level profile information;
   accessing a processor data area containing processor level accumulated profile information;
   calculating a change in processor level accumulated profile information;
   accessing kernel thread level profile information held by the operating system kernel;
   updating kernel thread level profile information held by the operating system kernel with the change in processor level accumulated profile information; and
   sending the kernel thread level profile information held by the operating system kernel to a requestor.

7. The method recited in claim 5 above further comprises:
   resetting the kernel thread level profile information held by the operating system kernel.

8. The method recited in claim 1 above, wherein updating profile information with the kernel thread level profile information based whether the identified kernel thread has been reused further comprises:
   updating an information area for a current application thread based on the identified kernel thread having not been reused.

9. The method recited in claim 1 above, wherein updating profile information with the kernel thread level profile information based whether the identified kernel thread has been reused further comprises:
   updating an information area for a previous application thread based on the identified kernel thread having been reused.

10. The method recited in claim 1 above, wherein updating profile information with the kernel thread level profile information based whether the identified kernel thread has been reused further comprises:
   accessing an information area for a application thread based on the identified kernel thread;
   updating an information area for the application thread.

11. The method recited in claim 3 above, wherein the application is a Java application.

12. A method for monitoring performance of a program being executed using per thread metric variables with reused kernel threads comprising:
   receiving a value of a metric variable for a kernel thread;
   determining if the kernel thread has been previously used by a first application thread; and
   applying the value of the metric variable to a second application thread if the kernel thread has been previously used by the first application thread.

13. The method recited in claim 12 above, further comprises:
   identifying the first application thread as being terminated based on the kernel thread having been previously used by the first application thread.

14. The method recited in claim 12 above, wherein the first application thread is a current application thread based on the kernel thread having not been used.

15. The method recited in claim 12 above, wherein determining if the kernel thread has been previously used by the first application thread further comprises:
   comparing an identity of the kernel thread to a list of identities of previously used kernel threads.

16. The method recited in claim 12 above, wherein the value of a metric variable for a kernel thread is a change in value of the metric variable since the last receipt of the metric variable for the kernel thread.

17. The method recited in claim 12 above, wherein the metric variable relates to one of allocation bytes, allocation objects, time, live object and live bytes.

18. The method of claim 12, wherein the value of the metric variable for the kernal thread is received in response to an event occuring based on the execution of the second application thread.

19. The method of claim 12, wherein applying the value of the metric variable to the second application thread in a node associated with the second application thread by an amount equal to the value of the metric variable.

20. A method for monitoring performance of a program being executed using per thread metric variables with reused kernel threads comprising:
   receiving a plurality of values of metric variables for a plurality of kernel threads;
   for each kernel thread:
      determining if a kernel thread has been previously used by a prior application thread; and
      applying the value of the metric variable for the kernel thread to a current application thread if the kernel thread has been previously used by a prior application thread.

21. The method recited in claim 20 above, wherein the plurality of values of metric variables for a plurality of kernel threads are received from an operating system kernel wherein each of the plurality of values was contained in a linked list of entries, each entry in the linked list being a value of a metric variable for a specific kernel thread.

* * * * *